US009025592B2

(12) United States Patent
Speks et al.

(10) Patent No.: US 9,025,592 B2
(45) Date of Patent: May 5, 2015

(54) BLADE CLUSTER SWITCHING CENTER SERVER AND METHOD FOR SIGNALING

(75) Inventors: Oliver Speks, Eschweiler (DE); Jacky Wu, Shanghai (CN)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 607 days.

(21) Appl. No.: 12/993,627

(22) PCT Filed: May 21, 2008

(86) PCT No.: PCT/EP2008/004075
§ 371 (c)(1),
(2), (4) Date: Feb. 8, 2011

(87) PCT Pub. No.: WO2009/140978
PCT Pub. Date: Nov. 26, 2009

(65) Prior Publication Data
US 2011/0124342 A1    May 26, 2011

(51) Int. Cl.
*H04L 12/50*   (2006.01)
*H04W 24/00*   (2009.01)
*H04L 29/08*   (2006.01)
*G06F 9/50*    (2006.01)
*H04W 28/08*   (2009.01)

(52) U.S. Cl.
CPC ......... *H04L 67/1008* (2013.01); *H04L 67/1029* (2013.01); *G06F 9/505* (2013.01); *H04W 28/08* (2013.01); *H04Q 2213/13098* (2013.01); *H04Q 2213/13164* (2013.01); *H04Q 2213/13166* (2013.01); *H04Q 2213/13292* (2013.01); *H04L 67/1027* (2013.01); *H04L 67/1002* (2013.01)

(58) Field of Classification Search
CPC ..... H04W 88/14; H04W 92/24; H04W 92/14; H04W 28/08; H04W 40/24; H04W 76/04; G06F 13/00; G06F 9/4405; G06F 9/5011; G06F 9/505; H04L 67/1008; H04L 67/1029
USPC ......................................................... 455/561
See application file for complete search history.

(56) References Cited

U.S. PATENT DOCUMENTS

| 6,389,448 B1* | 5/2002 | Primak et al. ................. 718/105 |
| 6,553,227 B1* | 4/2003 | Ho et al. ....................... 455/433 |
| 6,947,758 B2* | 9/2005 | Nguyen ......................... 455/466 |
| 8,654,762 B2* | 2/2014 | Speks et al. ................... 370/360 |
| 2002/0187790 A1* | 12/2002 | Papadimitriou et al. ...... 455/452 |

(Continued)

FOREIGN PATENT DOCUMENTS

| JP | 2006309777 A | 11/2006 |
| JP | 2007013612 A | 1/2007 |

(Continued)

*Primary Examiner* — Matthew Sams
(74) *Attorney, Agent, or Firm* — Coats & Bennett, PLLC

(57) ABSTRACT

The present invention relates to a switching center server (100) handling calls, comprising a blade cluster with a plurality of different blades (110), a distributor (125, 170) distributing a message relating to a call to one of the blades, a master (130, 150) centrally controlling a usage of pooled resources by said plurality of blades (110) for handling the call, wherein the distributor contacts the master for retrieving the information to which blade said message is to be distributed. The different blades in the blade cluster are seen from the outside as one node, so that for message distribution the master is contacted in order to distribute the message relating to a call to the blade that is handling said call.

37 Claims, 13 Drawing Sheets

(56) References Cited

U.S. PATENT DOCUMENTS

| | | |
|---|---|---|
| 2004/0088410 A1 | 5/2004 | Flynn et al. |
| 2005/0015430 A1* | 1/2005 | Rothman et al. ............. 709/201 |
| 2005/0034000 A1 | 2/2005 | Lee |
| 2006/0133425 A1 | 6/2006 | Kimball |
| 2006/0184349 A1* | 8/2006 | Goud et al. .................... 703/24 |
| 2007/0109960 A1 | 5/2007 | Feng |
| 2011/0134749 A1* | 6/2011 | Speks et al. .................. 370/217 |

FOREIGN PATENT DOCUMENTS

| | | |
|---|---|---|
| JP | 2007143145 A | 6/2007 |
| JP | 2008034947 A | 2/2008 |
| WO | 2008/119397 A1 | 10/2008 |

* cited by examiner

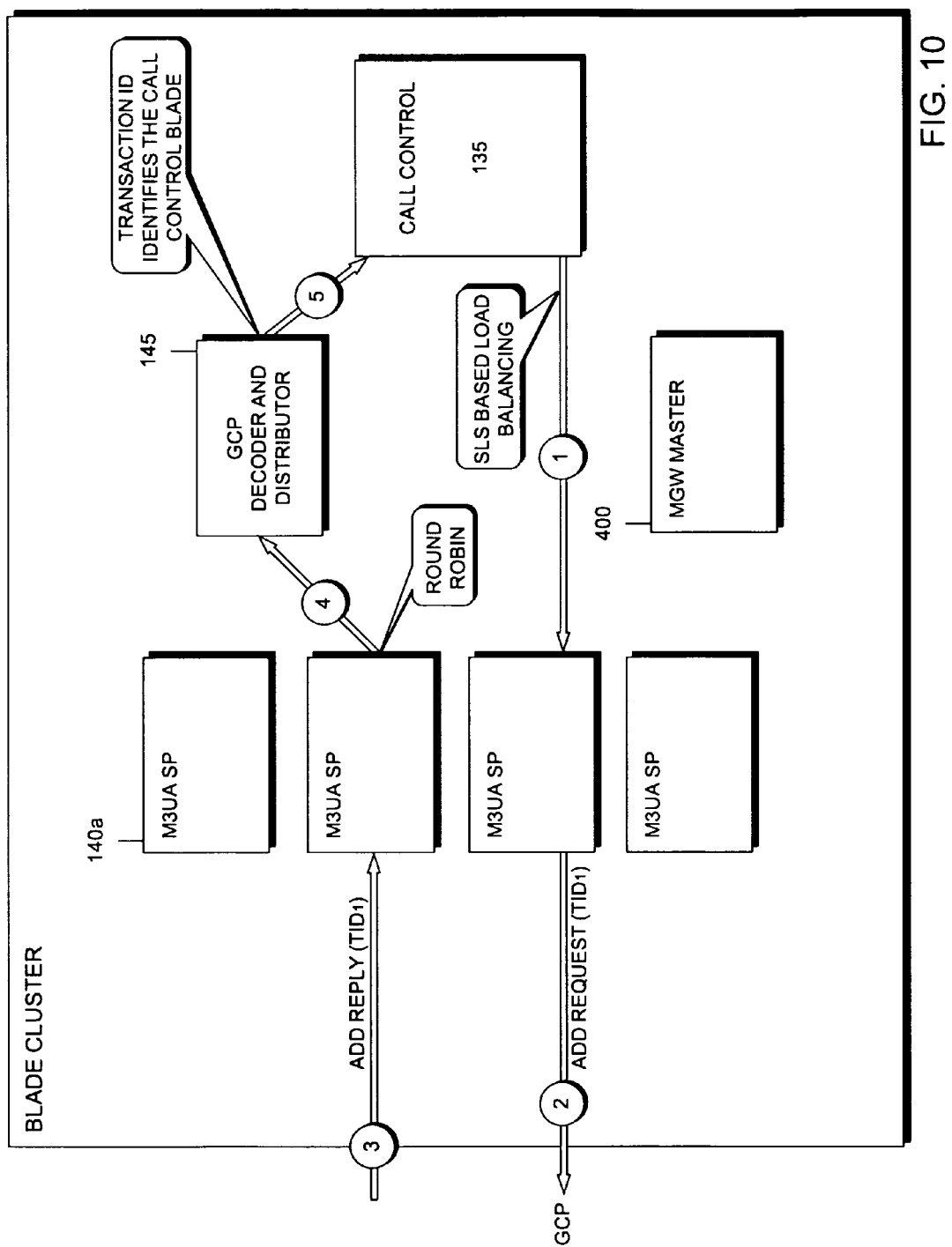

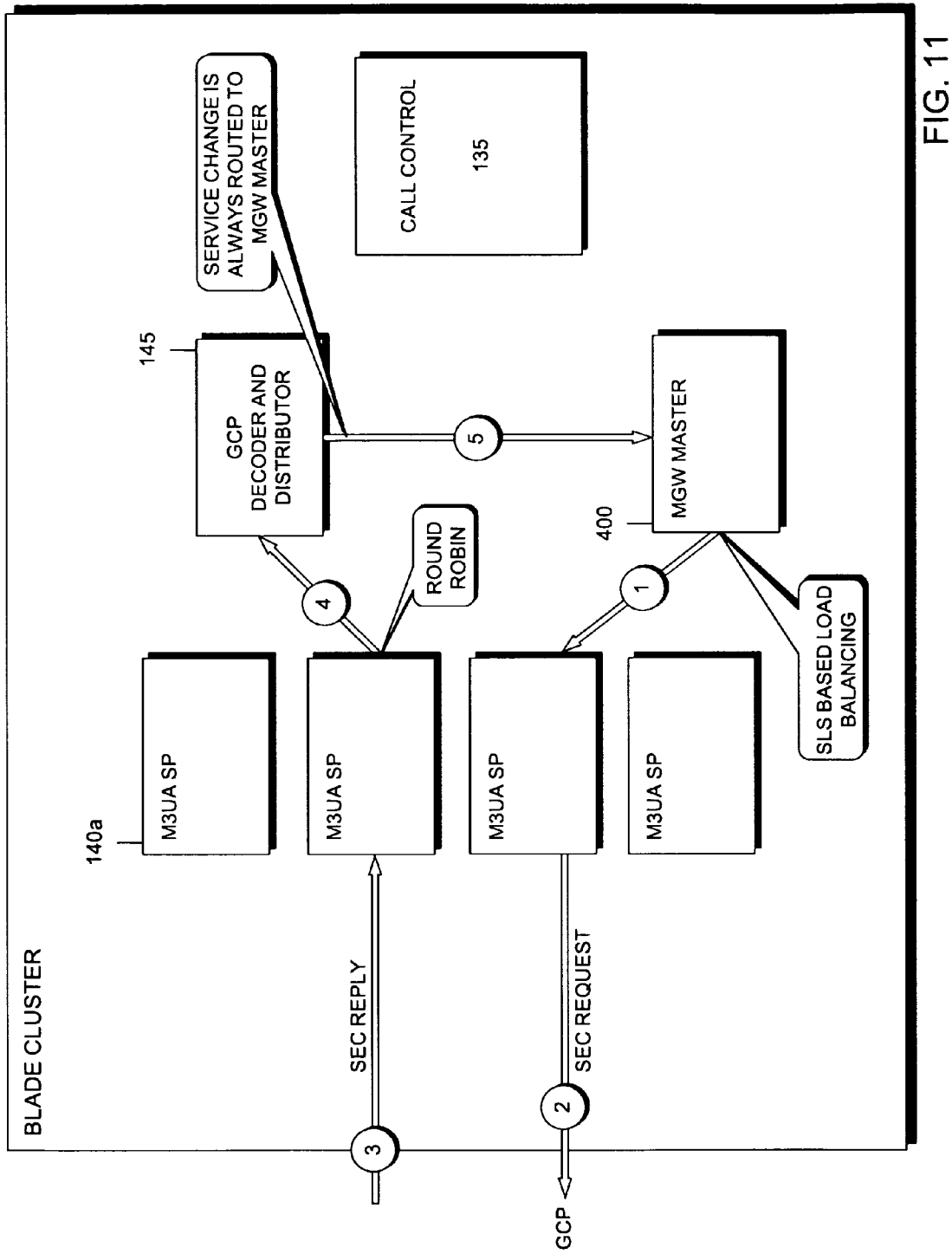

BLADE CLUSTER SWITCHING CENTER SERVER AND METHOD FOR SIGNALING

TECHNICAL FIELD

This invention relates to a switching center server handling calls and to a method for distributing signaling messages to the call controlling blades in a switching center server. The invention relates additionally to a method for routing a reply message from a gateway to a blade of a switching center server having a cluster structure with a plurality of blades. The invention relates preferably, but not exclusively, to a mobile service switching center (MSC) server.

BACKGROUND

The industry trend goes towards high capacity scalable MSC servers. A typical architecture for such a system is a blade cluster structure. Transmission lines that carry payload are terminated in media gateways (MGw), and the switching of these resources is controlled by the MSC server.

Time division multiplex terminations (TDM terminations) are not very well suited to be controlled by a blade cluster system because neither the call controlling signaling nor the media gateway control signaling provides support for a multi-blade architecture. Before a termination can be used for a call, coordination of exclusive usage must be performed between the MSC blades. The seizure of terminations is coordinated by the media gateway. There is no need for inter-blade coordination on the MSC server side. Signaling messages need to be routed to the blade that handles the respective call. BICC (Bearer Independent Call Control Protocol) uses ephemeral terminations but requires coordination of the call instance codes (CIC) on the MSC server side, since they are a common resource of all blades.

With the existing technology there is no possibility to share TDM terminations and CICs amongst several blades. The range of available TDM circuits and for BICC the range of call instance codes has to be partitioned. Each partition is administratively assigned to a particular MSC blade.

In FIG. 1a such a MSC server known in the art is shown. The switching center server 10 has a blade structure cluster with a plurality of blades 11. For the communication with the media gateway 15 the media gateway is divided into several virtual media gateways 16, each virtual media gateway communicating with one blade 11 of the server. Each physical media gateway needs to be configured with one virtual media gateway for each MSC blade. The partitioning of the resources and the assignment of one blade to one virtual media gateway has several disadvantages. First of all, the configuration of the MSC server is more complex compared with a system that does not need to partition the TDM circuits. If one of the blades in the configuration shown in FIG. 1 fails, the resources assigned to the virtual media gateway cannot be used for call connections. Additionally, when the number of blades is changed, e.g. in order to increase the processing power of the server, the media gateway has to be adapted as well.

In FIG. 1b the external network view for a MSC server having a blade structure as known in the art is shown. The MSC server appears as having a signaling endpoint for each blade. To this end the circuits are partitioned on the different blades. In the example shown the MSC server appears as two servers with two signaling proxies in front. When a new blade is added to the server, the entire system including the virtual media gateways and the partitioning of the resources has to be re-configured.

SUMMARY

In view of the above problems a need exists to provide a possibility allowing to easily change the configuration of the blade server cluster without influencing the control of the resources.

This need is met by the features of the independent claims. In the dependent claims preferred embodiments of the invention are described.

According to a first aspect of the invention a switching center server handling calls is provided, the switching center server having a cluster structure with a plurality of different blades. A distributor is provided distributing a message relating to a call to one of the blades and a master that is centrally controlling the usage of pooled resources by said plurality of blades handling a call is provided. For the distribution of the message relating to a call to one of the blades the distributor contacts the master for retrieving the information to which blade said message is to be distributed. The set of circuits, channels and user plane termination are examples for pooled resources that should be accessible for call handling on any blade. Each trunk route, A-interface route and each PRA (Primary Rate Access) has one blade that is responsible for maintaining the busy states of the used resources. For each route a master is provided centrally controlling the usages of the pooled resources (route master), whereas for each ISDN access an access master is provided controlling the use of the channels. With the configuration of the switching center server with a distributor and a master, physical resources in the server are not visible or addressable by other nodes. The different blades in the blade cluster are seen from the outside as one node. A change of the number of blades has no impact on the configuration of other nodes. Especially additional processing capacity gained by installation of new blades can be utilized without any operational intervention in other nodes. An additional advantage is that no user plane bandwidth is unavailable for traffic when one or more blades fail, as the solution is robust against outage of any element. Outage of the master instance maintaining a pool does not affect the users and outage of a user does not affect other users.

According to one embodiment of the invention the master decides on which blade the message should be distributed, the distributor distributing the message to the blade in accordance with the decision of the master.

When the switching center server receives a message being an initial message for a call setup, the master may decide on which blade the call should be controlled, the distributor distributing the message to the decided blade. Preferably, the master decides on which blade the initial message should be distributed taking into account the processing load of the different blades. As a consequence, it is possible to more evenly distribute the load situation of the processors provided on each blade. The master has the possibility to consider the processor load situation on all blades and to allocate calls foremost to the blades that have the lowest relative processor load.

However, when the distributor receives a message relating to an already established call, e.g. a message relating to a call already handled by said switching center server, the distributor should determine the blade among the plurality of blades that is handling said established call and distribute the message to said blade.

In addition to the distributor and the master a call controller may be provided controlling the resources used by the plurality of different blades for the duration of the call. The call controller provided on one of the blades performs the call control of said call meaning that it contains protocol state machines, decides upon call routing, controls the media gateways, performs charging, etc. Preferably, one call controller is provided for each call. The distributor may distribute the message relating to said call to the blade on which the call controller for said call is provided. Due to the fact that each blade is not addressable directly from the outside by a blade-specific address and due to the fact that the call controller may reside on any blade, the distributor has to distribute the message relating to said established call to the blade on which the call controller is provided.

According to one embodiment, the distributor contacts to this end the master for retrieving the information to which blade the message relating to said established call is to be distributed. Preferably, the distributor extracts resource identification data contained in the message for said established call and contacts the master in order to retrieve the information on which blade the call controller for said established call using the extracted resource identification data is provided, the distributor routing the message to said blade. The distributor has to query the master for every received message in order to find out if a call controller exists for the extracted resource identification data and on which blade it resides.

According to a further embodiment of the invention, the switching center server furthermore comprises a balancer allocating the message to one of the blades. The balancer allocates incoming messages on one of the MSC blades that is in an active traffic state for the purpose of load sharing without knowing exactly which blade is or will be the call controller. The balancer allocates the message preferably to one of the blades taking into account at least one of the following information contained in the message: originating information data (OPC), destination information data (DOP) and signaling link information data (SI, SLS). Furthermore, it is necessary that in case the balancer receives an incoming trunk message from a remote node that all messages related to the individual call are sent on the same path to the call controller. Accordingly, the balancer may be configured in such a way that a message containing originating information data, destination information data and/or signaling link information data is always allocated to the same blade. By way of example the balancer may produce a hash value out of the OPC, DCP, SI or CIC data. The balancer allocates the message to one of the blades depending on the hash value, this blade playing the role of the distributor.

The need of providing a switching center server having a single node view and allowing easy change of the number of blades is additionally obtained by a switching center server having a blade cluster as mentioned above and having a reply message distributor distributing a reply message from a gateway to one of the blades. In order to assure that the reply message received from the media gateway is distributed to the call controlling blade, the call controller generates transaction identification data TID containing blade identification data allowing to identify the blade on which the call controller is provided. When the switching center transmits the transaction identification data TID to a gateway, the received reply message is routed by the reply message distributor to the blade on which the call controller is provided using the blade identification data contained in the transaction identification data TID.

According to one embodiment of the invention a signaling endpoint of the switching center server receives the reply message and transmits it to one of the blades which will then act as reply message distributor. The signaling endpoint transmits the reply message preferably to one of the blades depending on the signaling load of the different blades. The decoding of the reply message is a processor power demanding process, so that this step should be distributed among the different blades. The reply message distributor can then distribute the reply message to the identified call controller.

After having received the reply message, the call controller may then send an initial address message (IAM) to the remote node. When the switching center server receives a backward message, e.g. address complete message (ACM), the balancer transmits it to the distributor which distributes said backward message to the call controller. As it is the case for any message related to an established call, the backward message may be received by the balancer from where the backward message is transmitted to one of the blades, preferably by taking into account at least one of the following pieces of information contained in the backward message: the originating information data (OPC), the destination information data (DPC), and signaling link information data (SI).

As mentioned above, according to one embodiment of the invention the blade cluster is configured in such a way that the different blades of the cluster are addressable from a remote node by one common address. Signaling point codes and IP addresses are common to all blades and are not used to identify individual blades.

In the following the handling of primary rate access (PRA) calls with the multiblade structure is discussed. For a PRA originating call the distributor extracts call reference data contained in any inbound message for said call and contacts the PRA master in order to retrieve the information on which blade the call controller for said call using the extracted call reference data is provided, the distributor routing the message to said blade. The PRA master contains a look-up table linking the call reference data to the blade on which the call is handled.

For a PRA terminating call the call controller generates a call reference including blade identification data, the distributor distributing any inbound message relating to said PRA terminating call to the blade handling said call using said blade identification data.

Accordingly, the call controlling blade is identified by the blade identification data encoded in the call reference for a PRA terminating call, whereas for a PRA originating call the identification of the call controlling blades is carried out using the call reference and the PRA master.

Notifications are normally initiated from the media gateway side, but are requested by the switching center server. In order to find out the call controlling blade for a notify command from the media gateway, request identifiers (RID) are used. A notify request command sent by one blade comprises a request identifier, the notify command received from the media gateway comprising said identifier which is then used to direct the notification to said blade requesting the notify.

According to another embodiment of the invention, the master controls maintenance procedures. During an established call, maintenance messages related to the circuits used by said call will arrive at the call controlling blade due to the routing mechanisms described above. Preferably, the call controller informs the master of received maintenance message, the master informing all blades of the status of the maintenance messages. The master is responsible for administering the maintenance procedures and the master assures that all blades are informed of the status of the maintenance procedures.

The above-mentioned need is furthermore addressed by a method for distributing a call to a blade of a switching center server, the method comprising the step of receiving a message relating to a call and distributing said message relating to call to one of the blades, wherein for the distribution of said message the master is contacted for retrieving the information to which blade said call is to be distributed. If it is an initial message for call setup, the master can decide on which blade the message should be distributed taking into account the processing load of the different blades.

In case a message is received relating to an established call, the blade among the plurality of blades is determined that is handling said established call and the message is distributed to said call. The call controller handles the call, so the message relating to said established call is distributed to the blade on which the call controller resides. Preferably, the distribution of the calls is carried out in a two-step process. In a first step the message is allocated to one of the blades of the blade cluster, this allocation step ensuring that the processing load of message handling and decoding is distributed among the MSC blades. This step must not be burdened with deep decoding and handling of application-level protocols due to conceptual reasons and because it is not scaleable and there is the risk of becoming a bottleneck for the call handling process.

In one embodiment of the invention, the message is allocated to one of the blades depending on the originating information data, destination information data and/or signaling link information data. Once the message has been allocated to one blade, the blade among the plurality of blades is determined that is controlling the call, wherein for the determination the master is contacted in order to retrieve the information to which blade the message relating to an established call should be directed. To this end, resource identification data contained in the message for said established call is extracted and the master is contacted in order to retrieve the information on which blade the controller for said established call using the extracted resource identification data is provided. Finally, the message is routed to said blade which is controlling the extracted resource.

The above-described handling is preferably valid for incoming messages that are transferred to the switching center server. An outgoing message may be directly transmitted from the call controlling blade to its destination.

Furthermore, a method for routing a reply message from a gateway to a blade of a switching center server is provided, the method comprising the steps of generating transaction identification data containing blade identification data allowing to identify the blade on which the call controller is provided. When the switching center server has transmitted the transaction identification data to the gateway and a reply message is received from the gateway, the reply message can be routed to the blade on which the call controller is provided based on the blade identification data contained in the transaction identification data.

Preferably, the reply message is allocated to one of the blades and decoded on said one blade in order to identify the blade identification data contained in the transaction identification data, wherein the reply message is distributed to the blade on which the call controller is provided based on the blade identification data.

The reply message from the gateway may be received at a signaling endpoint of the server from where the reply message is transmitted to one of the blades taking into account the signaling load of the different blades. On this blade the blade identification data are extracted.

In case more than one call controller is involved in the handling of the call, transaction identification data containing different blade identification data is generated and transmitted to the gateway for each involved blade. When an initial address message (IAM) for a connection to a remote node is transmitted to the remote node, a backward message (e.g. ACM) is received from the remote node and the backward message is distributed to the blade on which the call controller is provided that has transmitted the IAM. The backward message is distributed by accessing the master and by requesting the information on which blade the call controller is provided.

A dual seizure condition is a network condition where an IAM is received for a CIC for which an outgoing IAM has already been sent. This dual seizure condition for a resource, such as a CIC, can be detected by the call controller when it receives an IAM from a remote node for a resource for which the call controller has already transmitted an IAM to the remote node.

In case a request for resources cannot be met, a seizure request for resource may be queued, wherein when it is indicated to the master that a call attempt is to be removed from the queue, the master removes the seizure request for said call attempt from the queue.

According to another aspect of the invention, a failing blade transmits a failure information to the master, the master informing the other blades about the failure.

BRIEF DESCRIPTION OF THE DRAWINGS

In the following the invention will be explained in more detail with reference to the accompanying drawings, in which

FIG. 10 shows a switching center server with routing of call-related GCP messages, and FIG. 11 shows a switching center server with a routing of service change message.

In connection with FIGS. 2 and 3, the network view of a switching center server according to the invention is explained in more detail. When FIG. 2 is compared to FIG. 1b, it can be seen that with a MSC server of the invention the server appears as one signaling endpoint for all blades.

Network View

Physical resources in the server are not visible or addressable by other nodes. A change of the number of blades has no impacts on the configuration of other nodes. Specifically, additional processing capacity gained by installation of new blades can be utilized without any operational intervention in other nodes.

From architecture point of view, two different approaches are used: MTP (Message Transfer Part) based signaling stack and non-MTP based signaling stack. The connection towards MSC blades can be done in the following ways:

GCP (Gateway Control Protocol) can be carried either directly over SCTP (Stream Control Transmission Protocol) or over M3UA (MTP3 User Adaptation Layer)/SCTP, CN (Core Network). Call control related signaling (ISUP (ISDN User Part), BICC, TUP (Telephony User Part) is always carried over an M3UA/SCTP stack.

A-interface call control signaling (BSSAP) is always carried over SCCP/M3UA/SCTP stack.

DSS.1 (Digital Subscriber Stage Signaling System No. 1) is always carried over IUA/SCTP.

Figure 1A:
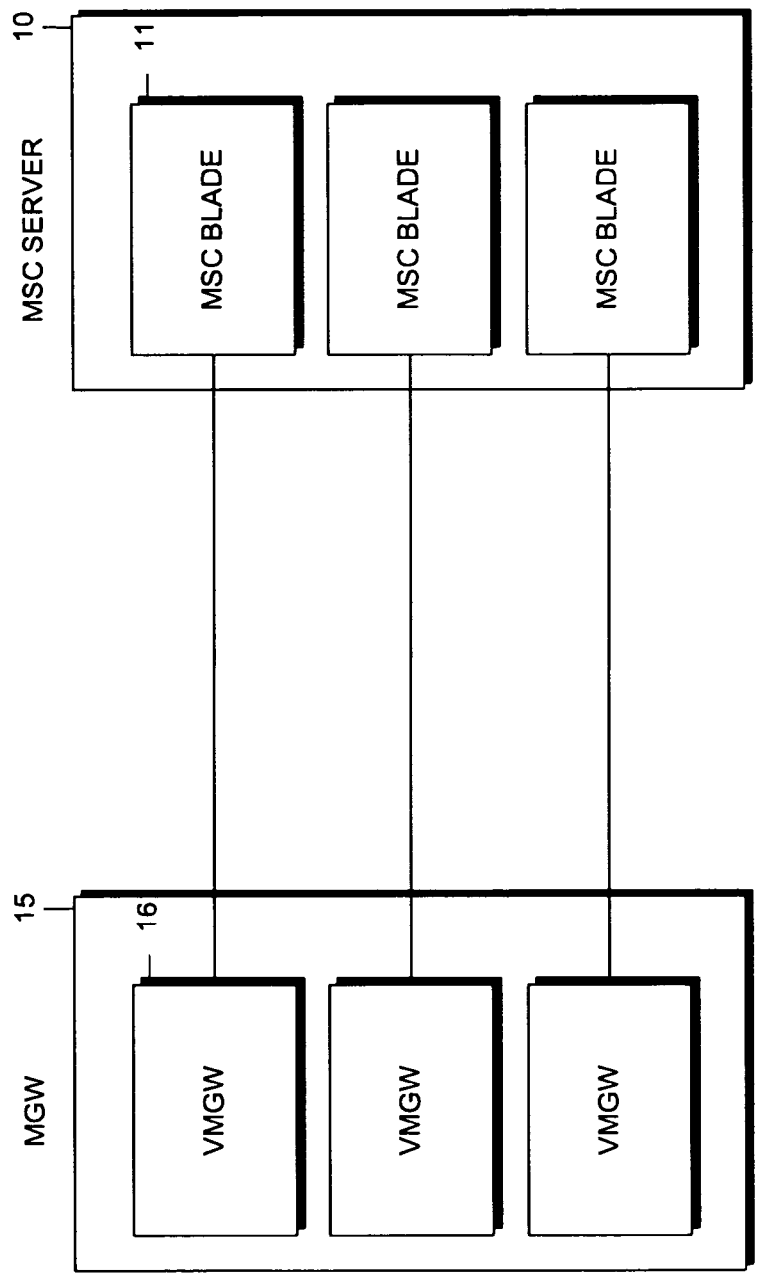
FIG. 1a shows the gateway control interface between blade cluster switching server and media gateway according to prior art.
Figure 1B:
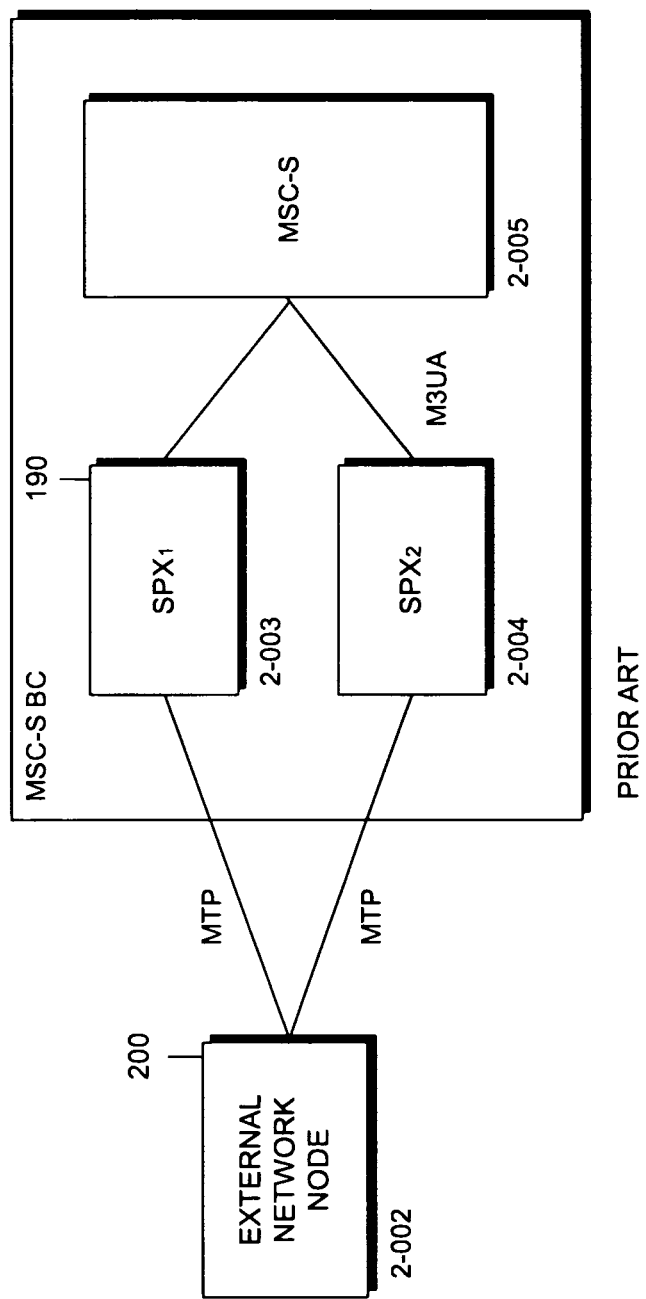
FIG. 1b shows the trunk signaling interface between blade cluster switching server and a remote network node, according to prior art.
Figure 1C:
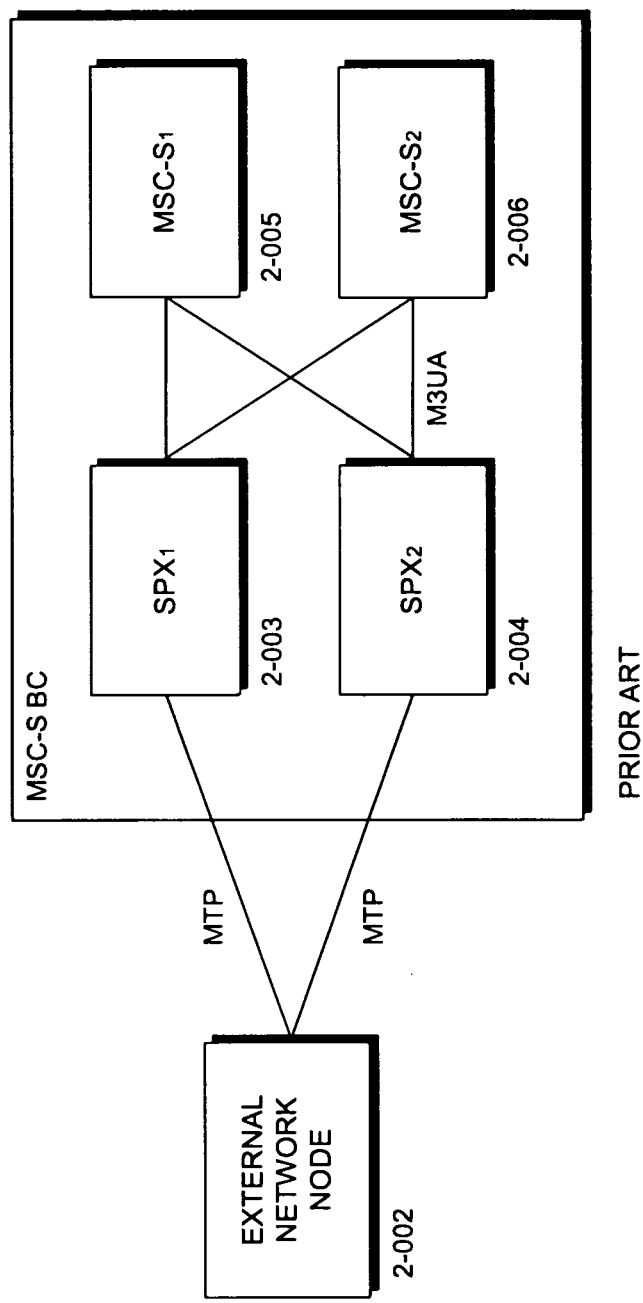
FIG. 1c shows a triple node view when using MTP3 for A-interface, according to prior art
Figure 2:
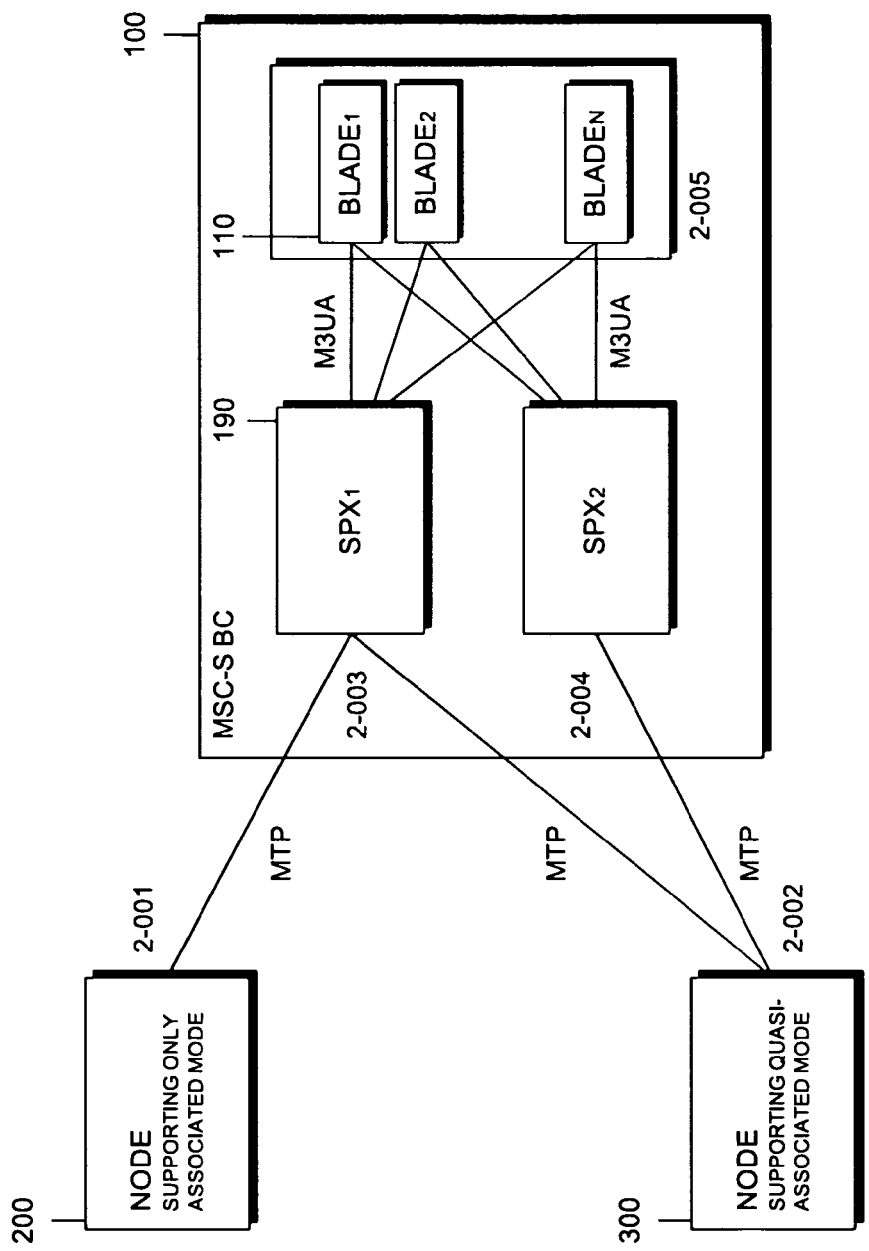
FIG. 2 shows a triple node view when using MTP3 for trunk signaling and A-interface.

When MTP3 is used for signaling towards Media Gateway MGw or BSC (Base Station Controller), then a MSC-S BC (Blade Cluster) 100 presents a triple node view, as can be seen in FIG. 2. It will appear like two STP (Signaling Transfer Point) nodes with one MSC-S node. All signaling towards the MSC-S has to pass the STPs 190. The remote nodes 200, 300 do only need to know the three signaling point codes of these nodes. Addition or removal of blades has no impact on signaling configuration of the remote nodes. The STPs perform load balancing by spreading signaling traffic on the MSC blades. Two STPs are used in order to increase redundancy and to share load.

Standard MTP procedures for quasi-associated mode will ensure that at failure of one STP or related signaling link, the signaling link towards the other STP is used. Nodes that do not support quasi-associated mode are only connected to one of the two SPX (Signaling Proxy), without possibility of failover.

Figure 3:
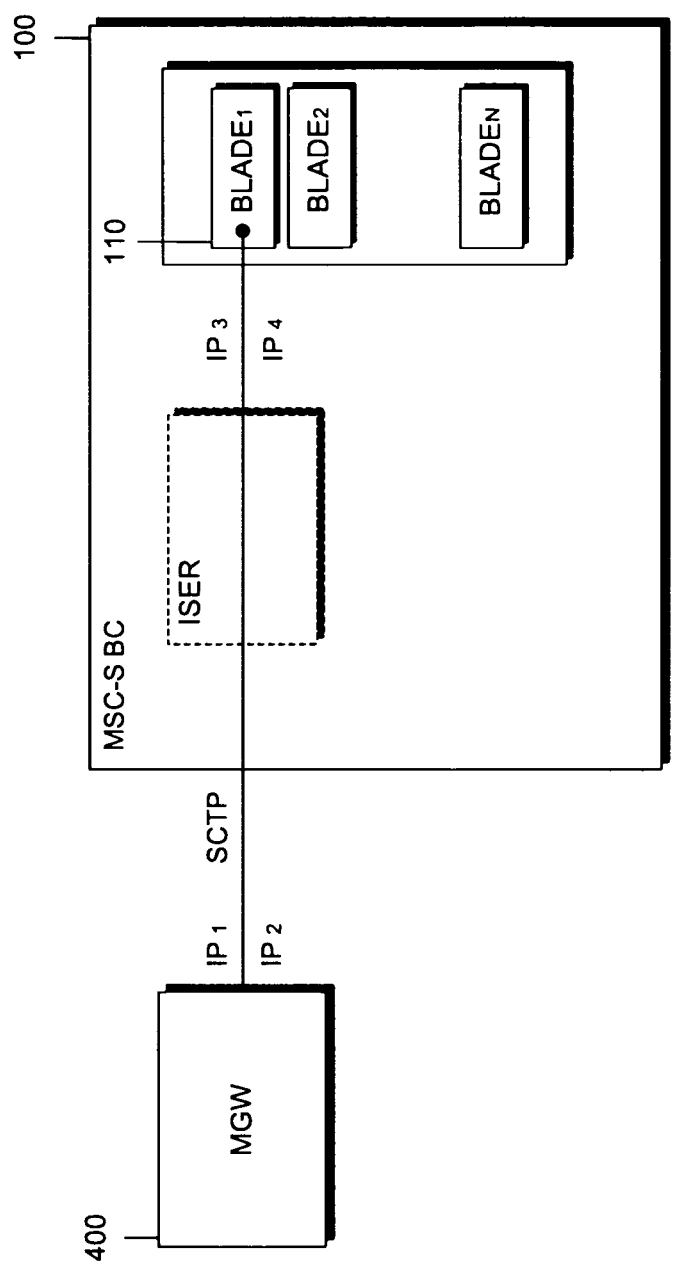
FIG. 3 shows the blade cluster as a single node view when using SCTP and GCP and DSS.1.

When SCTP is used for signaling towards MGw, then the MSC-S BC presents a single node view, as can be seen in FIG. 3. There will be only one SCTP association. Load sharing of one SCTP endpoint between several physical entities (blades) is not standardized and difficult to achieve. In order to achieve redundancy for the signaling path, multi homing is used, i.e. each endpoint is reachable with more than one IP addresses. The SCTP association is located at an MSC blade.

MSC Cluster Overview

The main aspects to be considered are even distribution of processing load on MSC blades as well as single node view. Signaling point codes and IP addresses are common to all blades and not used to identify individual blades.

All inbound traffic related messages must be routed to the call controlling blade. Distribution to the call controlling blade is performed in several stages. The initial stage makes sure that the processing load of message handling and decoding is distributed amongst MSC blades. This stage must not be burdened with deep decoding and handling of application level protocols due to conceptual reasons and because it is not scalable and is at risk of becoming a bottleneck. In order to preserve the sequence of MTP or M3UA carried messages, a hash based function is used guaranteeing that all messages that have the same OPC, DPC and SLS always take the same path through the blade cluster and are always handled by the same distributor blade. The final stages of distribution are performed on the MSC blades. These blades can take a higher load since they are scalable. They handle application level information. The MSC blades can take any of the following roles, some of which can be co-located or not applicable to certain signaling scenarios:

—SCTP Association Host

For non-MTP based signaling, the signaling connection is terminated on one MSC blade. That blade will act as balancer and/or distributor.

—Balancer

The balancer distributes incoming messages on the MSC blades that are in active state for the purpose of load sharing, without knowing which blade is or will be the call controller.

—Distributor

The distributor forwards the messages to other blades for call control.

—Controller

The controller blade is performing the call control of a call, i.e. it contains protocol state machines, decides upon call routing, controls the MGw, performs charging etc.

—Master

Each trunk-route, A-interface route and each PRA has one MSC blade that is responsible to maintain the busy states of connected circuits/channels. Call controllers request free circuits/channels belonging to a route/PRA from the master at set up and pass back control of the circuit at disconnection of a call.

Each MGw has a master blade that keeps track of global states of the MGw.

—Buddy

The buddy is allocated on a different blade than the master. It also helps to keep dynamic data redundant if the controller is on the same blade as the master.

—Coordinator

The coordinator role is taken by the blade that has been in active state for the longest time. It explicitly triggers re-allocation of master and buddy roles.

The proposed solution scales well because the number of blades handling a call as well as the number of messages sent between blades for a single call remains constant and is not a function of the number of blades. The roles of MSC blades are adaptively balanced between all blades. Removal of a single blade from the cluster or other recovery procedures on a single blade will only affect those calls that have a transaction ongoing on the affected blade or that are controlled by it.

Robustness

Different Level of Robustness can be Distinguished

At call level, the intended robustness is to keep calls unaffected of blade failures as much as possible. If the call handler blade performs certain type of recovery procedures or cannot process traffic for other reasons, then all calls controlled by it will be lost. The functionality provided by other blades that have supportive functions for the call, such as route or PRA master and MGw master can be moved to different blades at failure situations, without affecting ongoing calls. Therefore, at failure of m blades in a system with n blades, m/n of the complete number of call legs will be affected. A call can consist of more than one call leg, due to call forwarding or roaming rerouting. The share of affected calls will therefore be higher than the share of affected call legs.

At node level, the behavior of the node in the network should not change due to blade failures: In a system with n blades, the exchange data (both operator defined data and subscriber defined data) must survive m simultaneous blade failures with m<n. Except from mobile subscriber data, that is stored in the external HLR (Home Location Register) database, all exchange data is stored on the cluster blades. The required robustness can therefore be reached if all the exchange data is stored on every blade.

Circuit availability is an issue when circuits that have become idle due to failure of the call controlling blade should be available for traffic as soon as possible. The BUSY state of each circuit is also available at the master blade. The master blade will be informed by the cluster service about blade recovery or other type of outage of any blade in the cluster. The circuits that have been leased to a blade leaving the active state but not performing recovery actions that calls might survive can be re-used again immediately after performing circuit reset. Should the call controlling blade host the master function for the respective route or PRA as well, then the busy state is kept on the buddy blade in order to achieve the same level of circuit availability. The busy status of a circuit should be available on two blades at any given time. Circuits that have been leased to a blade performing a recovery procedure that calls might survive can not be used before the recovery procedure is finished, since the recovering blade decides which calls survive the recovery procedure.

Call Control

Since we want to achieve single node view, the information about which blade is acting as call controller must remain hidden to other signaling points: Blades can not be associated with point codes or CICs. The relationship between these identifiers and MSC blades is dynamically determined and only accessible within the MSC-S.

For inbound ISUP, TUP and BICC messages the balancer can use the signaling link selection value (SLS) that is used by MTP for load sharing purposes in order to spread the load of message processing of several blades, all of which must be in active state. The number of blades that the balancer sends messages to is only a matter of load sharing and does not matter from functional point of view. Recipient of the message sent from the balancer is the distributor. The distributor is stateless and has to query the route master for every received message in order to find out if a call controller exists for the CIC and on which blade it resides. The message is then passed on to the controlling blade. For inbound IAM messages, the route master has the possibility to consider the processor load situation on all blades and to allocate calls foremost to the blades that have the lowest relative processor load.

Outbound ISUP, TUP and BICC messages can be sent directly from the call controlling blade and do not need to pass distributor or balancer. For inbound DSS.1 messages, the call reference contains a bit that indicates if it was assigned by MSC or by PRA side:

If the reference was assigned by MSC, the message is a backwards message belonging to an ISDN access terminating call and the blade number is encoded in a few bits of the reference value. The blade that hosts the SCTP association will act as distributor and forward the message to the call controlling blade.

For PRA assigned call references, the message is in forward direction and belongs to an ISDN access originating call. The blade that hosts the SCTP association will act as distributor. It will let the PRA master point out the blade that controls the call.

Outbound DSS.1 message need to be sent to the blade that hosts the endpoint of the signaling association to the MGw the PRA is connected to. For BSSAP the SCCP (Signaling Connection Control Part) connection ID is used by the distributor to direct backward messages to the blade that initiated the connection.

Media Gateway Control

Most call related transactions are initiated from the MSC Server side, notifications are initiated from MGw side, service change commands can be initiated from both sides. For transactions that are initiated by the MSC-S, 6 bits in the Transaction Identifier (TID) can be designated to point to the blade that is controlling the context of the related call. The reply received from the MGw can then be routed to the blade that initiated the transaction. Notifications are ordered by MSC-S. The order contains a Request Identifier (RID). A few bits in the Request Identifier can be designated to point to the blade that is controlling the context of the related call. Notifications received from the M-MGw can then be routed to the blade that requested them.

In order to find out which blade is handling the related call, the GCP messages need to be decoded in order to see the transaction ID or request ID. The decoding of GCP messages is capacity consuming and needs to be well balanced between the MSC blades. Decoding of all messages from a single MGw on the blade that hosts the SCTP association is not seen as a good alternative: This approach would not scale and could become a bottleneck for large MGws. The message is sent for decoding to a different blade, which is chosen dependent on the current load distribution situation in the cluster. The blade that performs the decoding eventually passes the transaction to the right call controlling blade.

All non call related transactions will then be passed to the MGw master blade.

Traffic Handling Examples

The principles of message routing within the MSC-S BC is illustrated in the following with a few of the most frequent traffic cases. The logical entities shown as part of the blade cluster can be located on different blades. It is also possible that all or some of these entities are co-located on the same physical blade. The messages shown are selected as typical examples, to ease the understanding: "IAM" stands for any setup message sent in forward direction, "ACM" stands for any subsequent message sent in either direction. The "Add" command is used representatively for any call related command initiated by the MSC-S towards the MGw. In the examples, GCP is transferred over SCTP. If GCP is transported over M3UA/SCTP, then the signaling towards MGw passes the SPX. This does not affect the allocation of functionality between the blades and is therefore not shown.

Example: Trunk to Trunk Call

Figure 4:
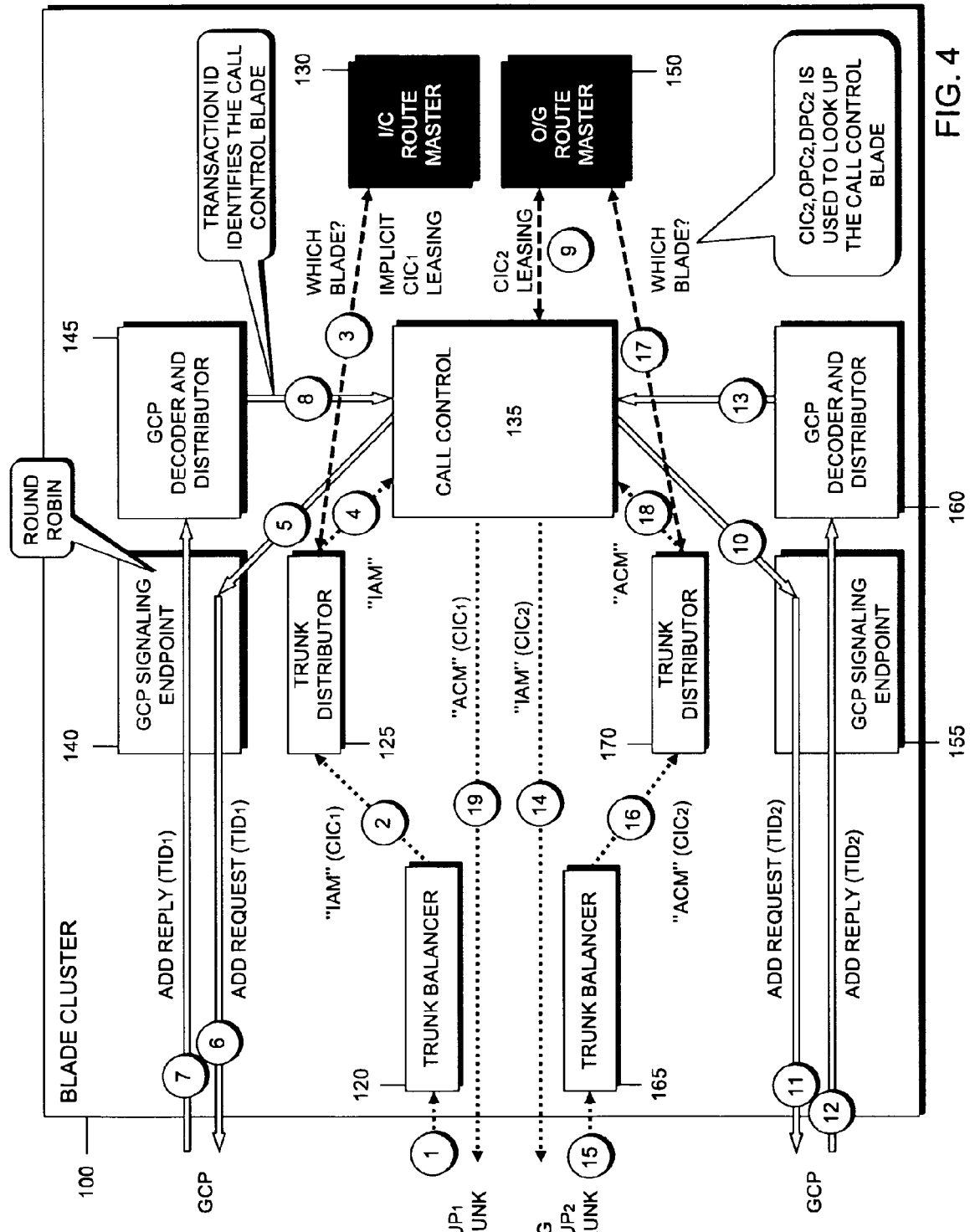
FIG. 4 shows a message handling in the switching center server for a trunk to trunk call.

The sequence in FIG. 4 shows a traffic case that requires only one MSC blade for call control. One GCP context is seized with two terminations. Two add commands are sent to MGw. This could be a trunk-to-trunk call, optionally with HLR interrogation.

A balancer 120 receives incoming trunk messages (step 1) from a remote node. All messages related to an individual call must be sent on the same path to the call controller. For this purpose, the balancer 120 produces a hash value out of $OPC_1$, $DPC_1$, $SI_1$ and $CIC_1$. Each distributor blade has a hash value range automatically assigned to it that takes the capacity of the blade into consideration. The message is sent to that blade (step 2), which will act as distributor 125. The distributor 125 routes the message to the blade that is controlling the call, or, if the CIC is idle, to the blade that will be controlling the call. It contacts the route master 130 to find out which blade has leased the CIC (step 3). If the CIC is idle, then the master 130 determines the blade to control the call and the CIC is implicitly seized. The distributor 125 then sends the message to the call controlling blade (step 4).

If a CIC was seized, the call controller 135 sends an Add Request GCP message towards MGw in order to add the termination that is tied to the selected CIC. It encodes it's own Blade ID into the transaction identifier $TID_1$. The GCP message is routed through the GCP signaling endpoint 140 (step 5) that owns the SCTP association leading to the right MGw (step 6).

The Add Reply GCP message that is received in response (step 7) is received by the GCP signaling endpoint. The GCP signaling endpoint 140 sends the message for decoding to a different blade, which is chosen dependent on the current load distribution situation in the cluster. The distributor is also called reply message distributor. The transaction identifier $TID_1$ contained in the message is found during decoding and it is used to identify the blade where the call controller resides and to which the GCP message must be distributed to (step 8).

Before IAM can be sent on outgoing trunk, call controller 135 requests from the route master 150 control over a circuit of the wanted outgoing route according to the selection type configured for the route (step 9). This circuit is identified by $CIC_2$.

The call controller 135 then sends an Add Request GCP message towards MGw in order to add the termination that is tied to the selected CIC. It encodes it's own BladeID into the transaction identifier $TID_2$. The GCP message is routed through the GCP signaling endpoint 155 (step 10) that owns the SCTP association leading to the right MGw (step 11).

The Add Reply GCP message that is received in response (step 12) is received by the GCP signaling endpoint 155. The GCP signaling endpoint 155 sends the message for decoding to a different blade 160, which is chosen dependent on the current load distribution situation in the cluster. The transaction identifier $TID_2$ contained in the message is found during decoding and it is used to identify the blade where the call controller resides and to which the GCP message must be distributed to (step 13).

The IAM (step 14) is sent to the remote node. The backward message (step 15) is received by the balancer 165 and passed to an MSC blade 170 (step 16) according to partitioning of the hash value that is calculated based on $OPC_2$, $DPC_2$, $SI_2$ and $CIC_2$. That blade acts as distributor. It needs to find out which blade is controlling the call. This information can be obtained from the route master 150 of the route the circuit 2 belongs to (step 17). The distributor blade 170 sends the backward message on towards the call controlling blade 135 (step 18), which forwards it on the incoming trunk (step 19).

Example: MS (Mobile Station) Terminating Call

Figure 5:
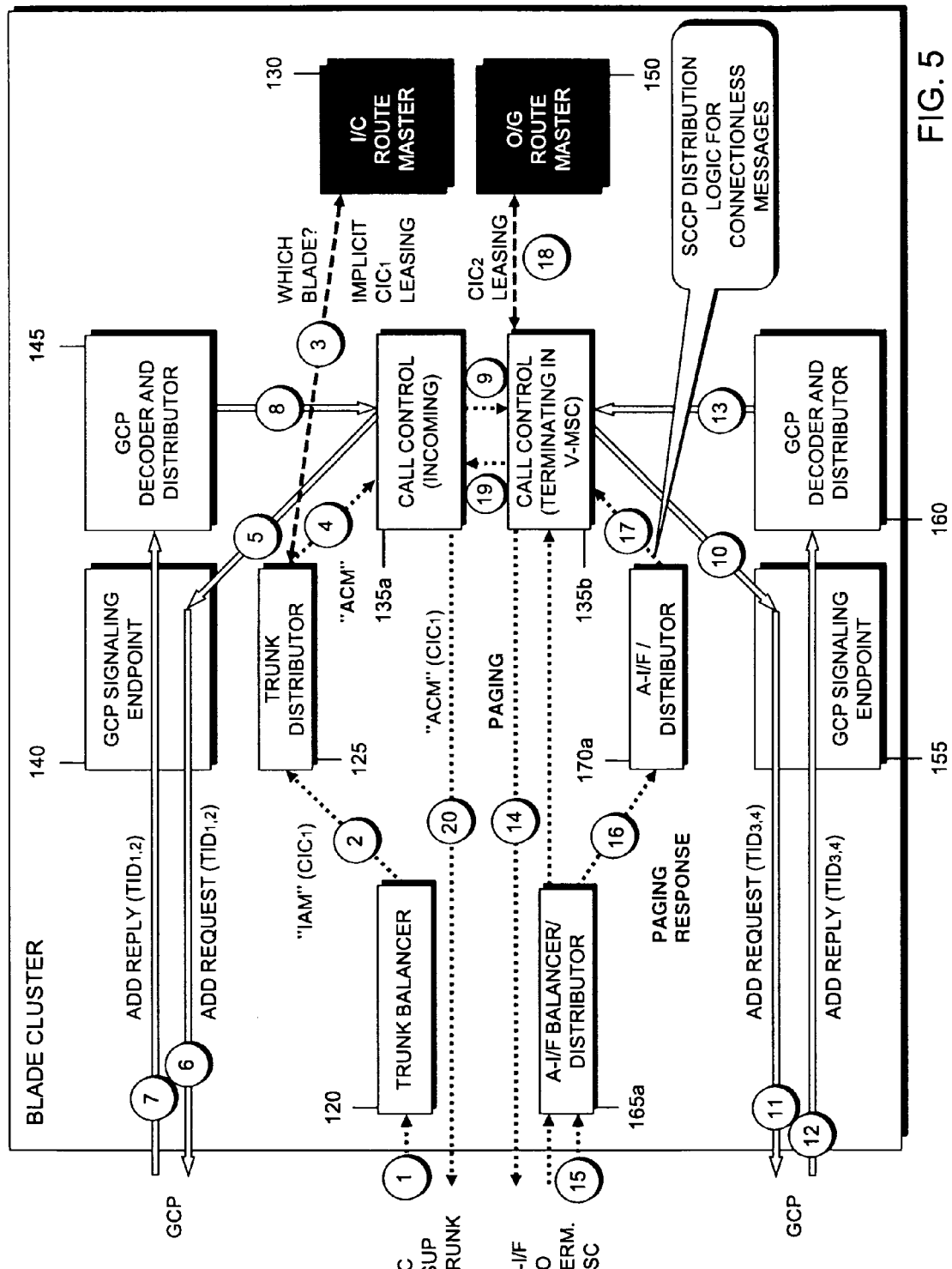
FIG. 5 shows a switching center server handling a call from the trunk terminating in a mobile communication unit.

The sequence in FIG. 5 shows a traffic case that requires two MSC blades 135a, 135b for call control. This happens when a terminating visited MSC call component is handled by the blade cluster. Since two blades are used for call control, two GCP contexts are created, one by each blade. In total, four Add commands are sent to MGw. Here, a call from trunk to GMSC with roaming rerouting to MS served by the same blade cluster is taken as example.

A balancer 120 receives incoming trunk messages (step 1) from a remote node. All messages related to an individual call must be sent on the same path to the call controller 135a. For this purpose, the balancer 120 produces a hash value out of $OPC_1$, $DPC_1$, $SI_1$ and $CIC_1$. Each distributor 125 blade has a hash value range automatically assigned to it that takes the capacity of the blade into consideration. The message is sent to that blade (step 2), which will act as distributor. The distributor 125 routes the message to the blade 135a that is controlling the call, or, if the CIC is idle, to the blade that will be controlling the call. It contacts the route master 130 to find out which blade has leased the CIC (step 3). If the CIC is idle, then the master 130 determines the blade to control the call and the CIC is implicitly seized. The distributor 125 then sends the message to the call controlling blade (step 4).

If a CIC was seized, the call controller 135a then sends an Add Request GCP message towards MGw in order to add the termination that is tied to the selected CIC. It encodes it's own BladeID into the transaction identifier $TID_1$. The GCP message is routed through the GCP signaling endpoint 140 (step 5) that owns the SCTP association leading to the right MGw (step 6).

The Add Reply GCP message that is received in response (step 7) is received by the GCP signaling endpoint 140. The GCP signaling endpoint sends the message for decoding to a different blade 145, which is chosen dependent on the current load distribution situation in the cluster. The transaction identifier $TID_1$ contained in the message is found during decoding and it identifies the blade where the call controller 135a resides and to which the GCP message must be distributed to (step 8).

The call controller 135a blade performs HLR interrogation and receives a roaming number. The procedure to obtain the roaming number and the handing out of the roaming number by the blade that serves the called subscriber is not shown in further detail.

The call controller 135a adds a second termination to set up a connection towards the context used by the second call controller 135b, if it is located on a different blade. The message flow follows steps (5) through (8), using transaction identifier $TID_2$.

The MSRN is used to route (step 9) the call to the blade that controls the terminating call component, if it is residing on a different blade.

The terminating call controller 135b adds a termination to set up a connection towards the context used by the incoming call controller 135a, if it is located on a different blade. It encodes it's own BladeID into the transaction identifier $TID_3$. The GCP message is routed through the GCP signaling endpoint (step 10) that owns the SCTP association leading to the right MGw (step 11).

The Add Reply GCP message that is received in response (step 12) is received by the GCP signaling endpoint 155. The GCP signaling endpoint 155 sends the message for decoding to a different blade, which is chosen dependent on the current load distribution situation in the cluster. The transaction identifier $TID_3$ contained in the message is found during decoding and it identifies the blade where the call controller 135b resides and to which the GCP message must be distributed to (step 13).

The Paging message (step 14) is sent connectionless to the BSC. The paging response (step 15) and the connection request are carried in a connectionless SCCP message. The signaling gateway based balancer sends any received connectionless message round robin to an arbitrary MSC blade 165a (step 16). That blade uses the TIMSI (Temporary International Mobile Subscriber Identity) contained in the message to find out which blade is controlling the call and distributes the message to it (step 17).

The blade controlling the terminating call requests from the route master 150 to get control over a circuit of the wanted outgoing route according to the selection type configured for the route towards the BSC (Base Station Controller) (step 18). This circuit is identified by $CIC_2$.

The call controller 135b then sends an Add Request GCP message towards MGw in order to add the termination tied to $CIC_2$. The message flow follows steps (10) through (13), using transaction identifier $TID_4$.

Since BSSAP (Base Station System Application Part) communication for the call control is connection oriented, further communication between the terminating MSC blade and the BSC can work without the help of before mentioned distributor. As soon as the SCCP connection requested by BSC is established, messages from BSC to MSC-S will directly be routed by the signaling gateway acting as distributor to the controlling MSC blade. This signaling gateway based distributor evaluates the local SCCP reference for the purpose of routing.

The call controlling blade for the terminating call component can send backward call control messages to the controlling blade for the originating call component (step 19). Backward messages to the incoming trunk are sent by the incoming call controller on the trunk (step 20).

Example: MS to MS Call

Figure 6:
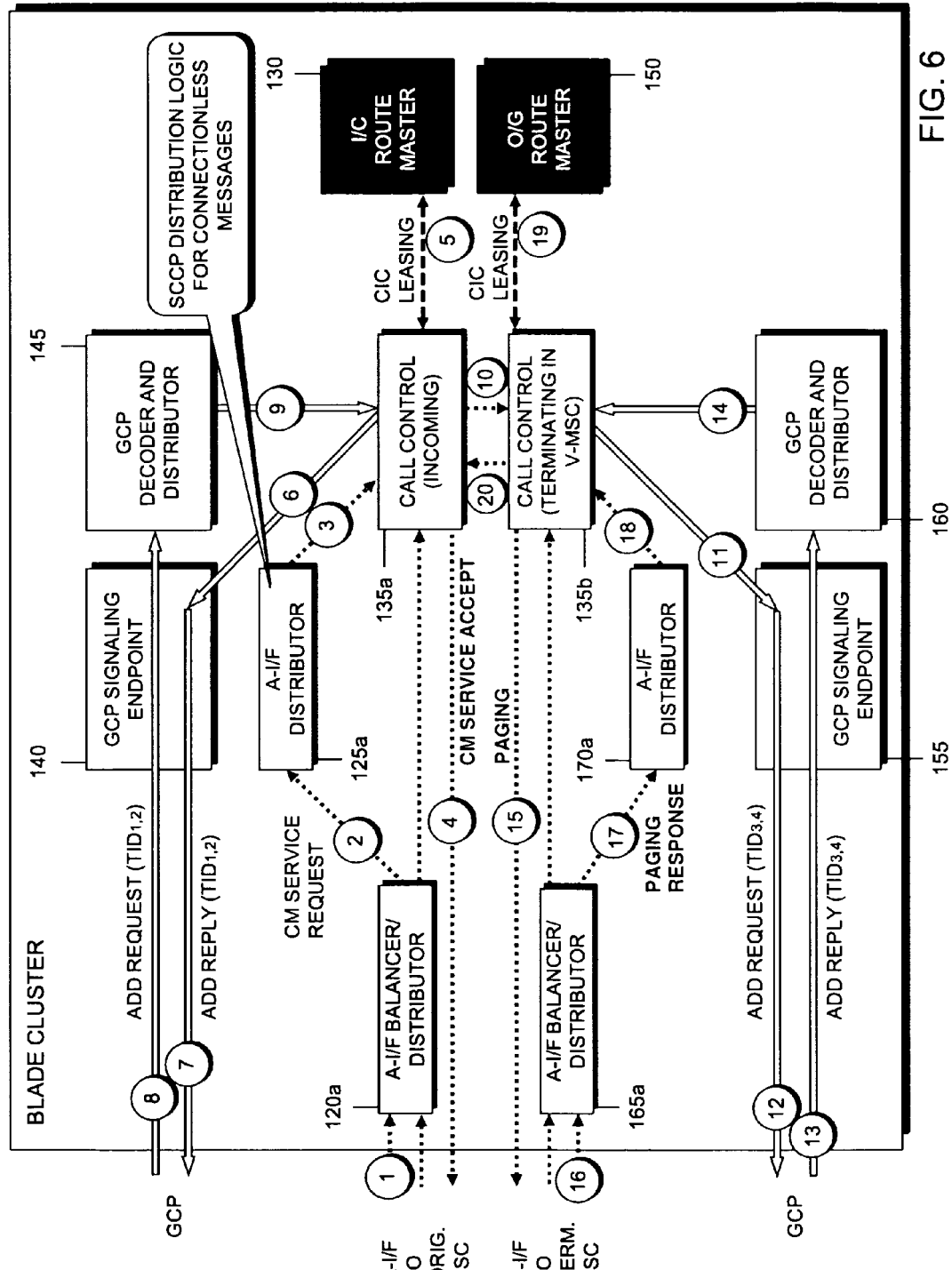
FIG. 6 shows a switching center server for a call connecting two mobile communication units.

The sequence in FIG. 6 shows a traffic case that requires two MSC blades for call control. This happens when subscriber data of calling and called party are residing on different blades. Each call controller seizes one GCP context with two terminations. In total, four Add commands are sent to MGw.

The difference to previous example is that the call originates from mobile access rather than from incoming trunk. The handling of the terminating call component is identical to the previous example.

The first message received from the BSC is the "COMPLETE LAYER 3" message with "CM Service Request" (step 1). The signaling gateway based balancer 120a sends it round robin to any MSC blade (step 2). The receiving blade analyzes the IMSI (International Mobile Subscriber Identity) in order to identify the blade that shall become call controller 135a and distributes the message (step 3) to that blade. The CM Service Accept (step 4) that is sent in reply is carried in a message that requests to set up an SCCP connection for the call. All further inbound messages are sent directly from the signaling gateway acting as distributor to the call controlling blade. This signaling gateway based distributor 120a uses the local SCCP reference for the purpose of routing.

The blade controlling the originating call component queries the route master 130 to get control over a circuit of the route towards originating BSC (step 5) according to the configured selection type. This circuit is identified by $CIC_1$.

The remaining handling is identical to the procedures described in the previous chapter about trunk to mobile call.

Example: Trunk to Trunk with Call Forwarding in V-MSC

Figure 7:
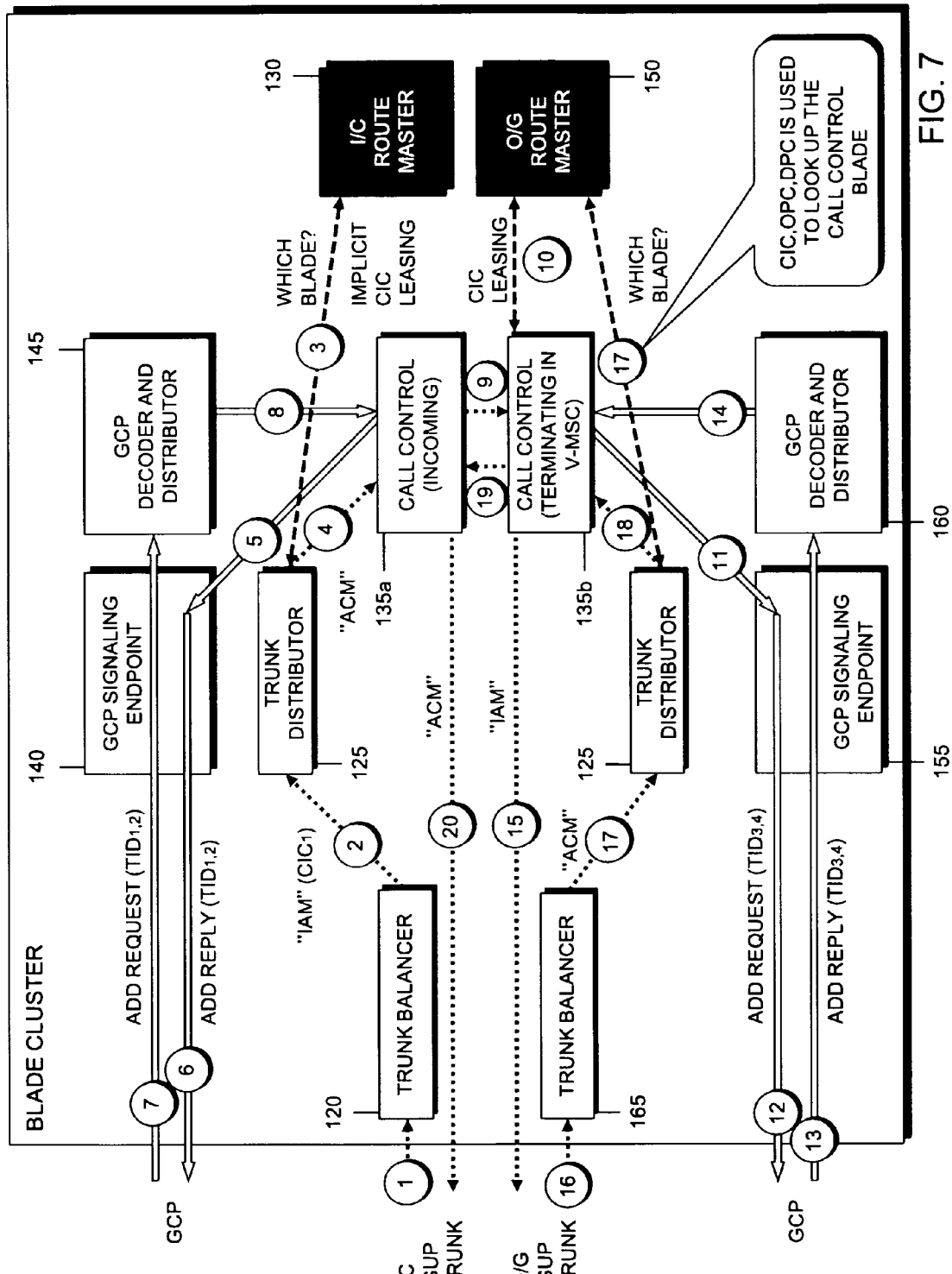
FIG. 7 shows a switching center server for a trunk to trunk call forwarded in co-located V-MSC.

In this example, illustrated in FIG. 7, the call is forwarded by V-MSC to an outgoing trunk (e.g. due to call forwarding at no reply). The incoming call from trunk is handled in the same way as described above. The handling of the outgoing trunk call is the same as described for the trunk-to-trunk call, except that this call component is handled on the call controller blade of the terminating component.

Example: Trunk to PRA Call

Figure 8:
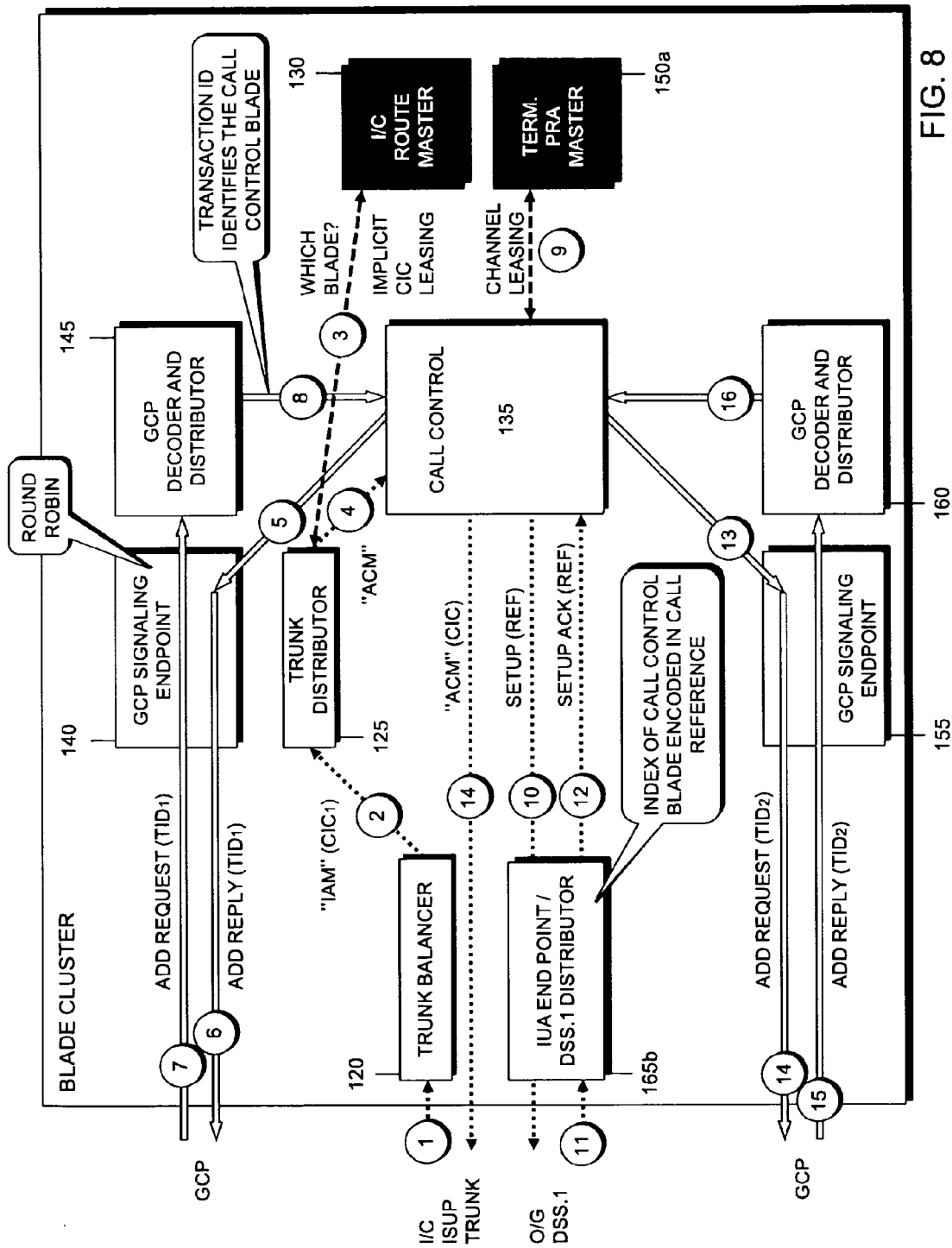
FIG. 8 shows a switching center server with a trunk to PRA call.

FIG. 8 shows a call from trunk terminating at primary rate access, that a private branch exchange (PBX) may be connected to. The blade that handles the incoming trunk call will control the terminating call leg as well.

The handling of incoming trunk signaling, including seizure of circuit and addition of termination in MGw is identical to incoming trunk handling described in the previous examples.

For the PRA terminating call, the call controller 135 requests the PRA master to seize a B-channel (step 9) on the primary rate access.

For the DSS.1 signaling, the call controller generates a call reference that includes it's own BladeID. The DSS.1 setup message (step 10) needs to be passed to the blade hosting the SCTP association of the endpoint towards the MGw on which the message is forwarded to the PRA. The response message (step 11) is received by that blade. The message contains the call reference, which was generated by the call controller. The DSS.1 distributor 165b can tell from the call reference, which blade is controlling the call and forwards the message to it (step 12). Once the channel is finally determined according to DSS.1 signaling procedures, the termination is added to the GCP context (steps 13 through 16).

Example: PRA to Trunk Call

Figure 9:
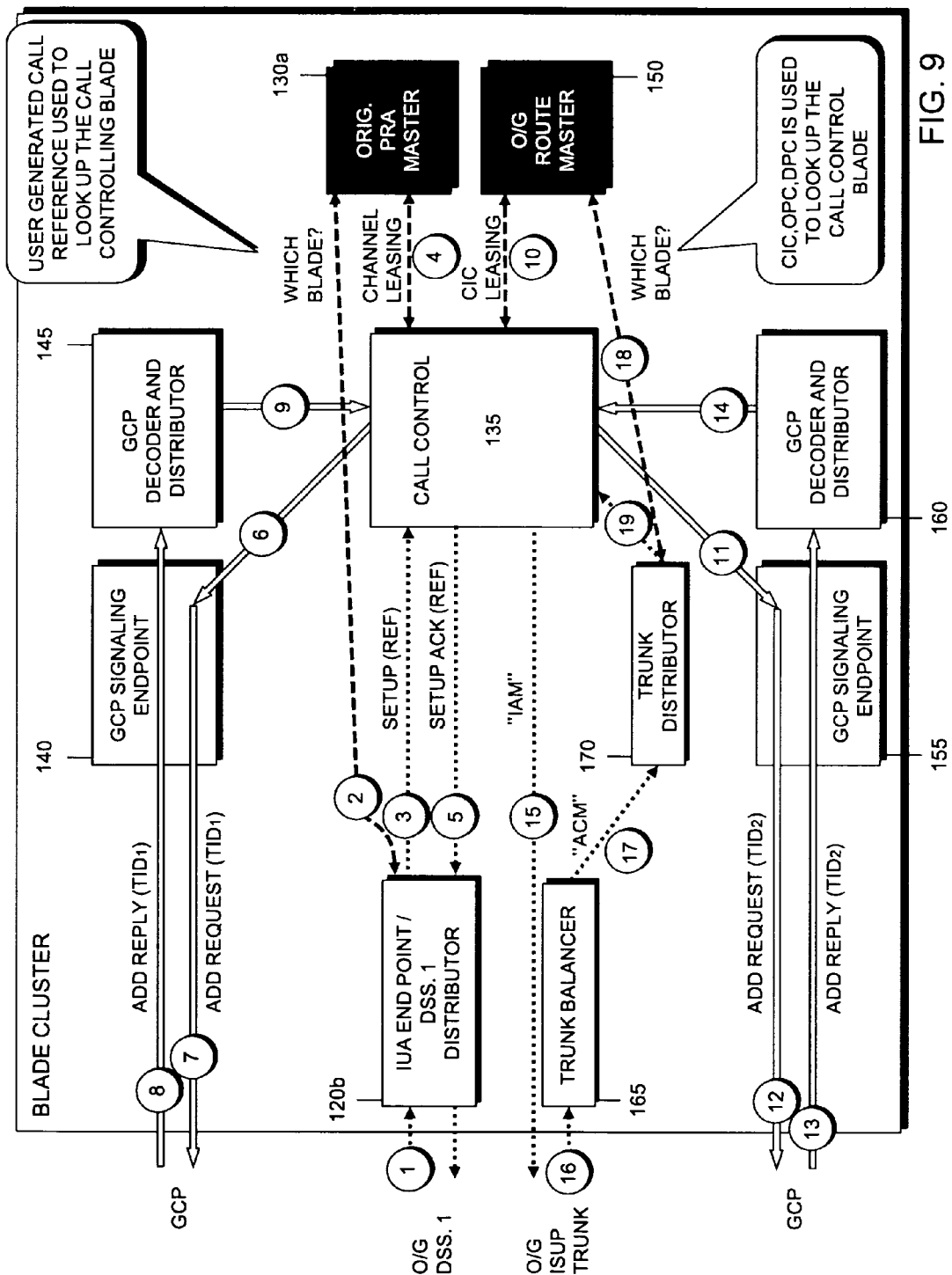
FIG. 9 shows a switching center server with a PRA to trunk call.

FIG. 9 shows a call from PRA to outgoing trunk.

The DSS.1 distributor blade 120b owns the endpoint of the SCTP association on which the SETUP message is received (step 1). The call reference is generated by the PRA for access originating traffic cases. The distributor 120b contacts the PRA master 130a to determine which blade shall control the call (step 2). The distributor 120b then sends the SETUP message to the blade determined by the PRA master 130a (step 3). That blade becomes the call controlling blade and tries to seize the channel that was indicated in the SETUP message by contacting the master 130a. If the channel is free (and other conditions, not discussed here, are met), then the blade will send SETUP ACKNOWLEDGE (step 5) and continue processing the outgoing call leg. The message is sent on the SCTP association towards the PRA. Then the corresponding termination is added to the GCP context of the call.

The handling of the outgoing trunk call component is identical to the examples described before.

CP Load Balancing

Good balancing of the processor load between the blades is a prerequisite for scalability of the blade cluster. If processor load is not distributed evenly, the blade that first hits the saturation will limit functionality of the entire cluster. Centralized functionality that is allocated on the blade that is working at the capacity limit will limit the performance of the other blades in the cluster, because of the dependency on the centralized function.

The quality of balancing is influenced from two sides:
  The granularity of the objects that are to be distributed can be a limiting factor as to how close the goal of optimal load balancing can be achieved. Additionally, larger objects are more difficult to move than small objects. Small granularity is better than large granularity.
  The processing load and storage need for an object should be known for optimal balancing. It can be derived from exchange data, be configured or be based on measurements. Measurements can be done in the lab or can be done during run-time in the field.

Trunk Circuit Handling

CIC Selection

Basic Functionality

The algorithm that is used to select a free circuit depends on the selection type that is provisioned for the route. Therefore, the selection of a free circuit can not be distributed, e.g. by dividing them into subsets of the set of free circuits to each blade. For each route, a dedicated blade is responsible to provide free circuits upon request and to return them to the pool of free circuits after call release. This blade is referred to as "route master".

On node level, the circuit selection is performed in the same way as in prior art since the seizure sequence for each route is centrally performed by the route master blade. There will be no difference visible on network level. The principle of CIC selection is the same as for conventional nodes: As long as no IAM has been sent yet, an incoming call attempt (IAM) takes always precedence. If an IAM has already been sent but no backward message been received in response yet, then an incoming IAM is handled dependent on which exchange is the controlling one for the CIC. The handling is detailed below.

Conflicts of CIC seizure can always be solved within a single blade, since the call control of both involved calls is allocated at the same blade.

Dual Seizure

Dual seizure is a network condition where IAM is received for a CIC, for which an outgoing IAM was already sent.

When the distributor dispatches an incoming IAM, the route master will be asked to locate the CIC. If the master detects that the CIC is already leased then it will inform the dispatcher to send the message to the call controller on the blade that has already leased the CIC. The dual seizure will be detected by the call controller when it receives an IAM on a CIC for that an outgoing IAM has been sent.

The arbitration can be handled in the same way as in prior non-cluster implementations. Since one of the calls will survive and the blade that leases the CIC does not change, there is no need to inform the master about the outcome of the dual seizure condition.

Call Collision

Call collision is a node internal condition where an IAM is received for a CIC that was already leased from the master for an outgoing connection, but no IAM has been sent for that CIC yet.

When the distributor dispatches an incoming IAM, the route master will be asked to locate the CIC. If the master detects that the CIC is already leased then it will inform the dispatcher to send the message to the call controller on the blade that has already leased the CIC. There is a race condition if the incoming IAM reaches the call controlling blade before that one sends the outgoing IAM:

- If the incoming IAM arrives at the call controlling blade before outgoing IAM is sent, the call collision will be detected by the call controller when it receives an IAM on a CIC that was already leased for an outgoing call. The incoming call will prevail. The master is not informed about change of call direction. The lease of CIC continues unaffected. A reselection of the outgoing call leg will normally follow.
- If the incoming IAM arrives at the call controlling blade after the outgoing IAM is sent, the scenario changes to dual seizure and the procedure as described in that context applies.

Trunk Queuing for Wireless Priority Service

If no free CIC is available, the request can be queued. This needs to be indicated in the seizure request. The queue is maintained by the route master. The queuing time is supervised by the call controller. If a maximal queuing time is reached, or the call attempt is aborted for other reasons, the call controller indicates towards the master that the call can be removed from the queue.

As soon as a blade leaves the active state, the master will remove seizure requests issued by that blade from the queue.

When the blade that the master resides on leaves the active state, then the call controller blade will request lease of the CIC from the new master.

CIC location

When the master cannot be queried by the distributor blade due to outage of the signaling or due to buffering mode at move of master role to a different blade, the message should be sent to the last known blade that has leased the CIC. It can be assumed that all messages related to the same call are passed through the same distributor. The mechanism shall be stopped for a certain CIC as soon as an IAM, RSC (Reset Circuit Message) or GRS (Circuit Group Reset) message for the same CIC is about to be distributed.

CIC Release

A call controller requests release of a leased CIC from the master after having sent or received RLC. Interference with subsequent call set up on the same CIC is described in the following.

Inhibiting Outgoing Seizure Sending Before Release Complete

The CIC must not be seized for a new call until the release procedure for the ongoing call has been completed. If the MSC BC sent REL, then it must wait for RLC before requesting release of the CIC from the route master. If the MSC BC received REL, it must request release of the CIC only after sending RLC. It must be prevented that a different blade seizes the same CIC and IAM arrives at the remote end before the RLC.

Allowing Incoming Seizure after Release Complete

When a remote node has sent RLC, then it can send IAM for the same CIC but for a new call immediately. If the first call was an outgoing call, then in most cases the new call will be controlled by a blade different to the one that controlled the first call. But it could happen that the distributor requests dispatching of the IAM before the controller of the first call has managed to request release of the CIC. In this case, the IAM is sent to the blade that controls the ongoing call and there is no implied CIC seizure. The call controlling blade is notified by the master that no implied seizure was performed and it has to explicitly request CIC seizure from the master for the new call.

Maintenance Message Handling

The functional roles of the MSC blades for maintenance messages are aligned to the handling of traffic messages as much as possible.

Procedures Initiated by Own Node

Failures during traffic handling that are detected due to protocol timer expiry can require sending of maintenance messages. The blade that detects the failure condition is in possession of control over the CIC. It will inform the route master, which will send maintenance messages according to the regular procedures, supervise the reception of acknowledgement messages and perform pumping of maintenance messages when applicable. The information about ongoing message pumping must be provided by the master to all blades, to have most possibly robustness against blade outage. Blocking states for so called manual blocking are available on all blades. Only the route master will send the appropriate blocking message and supervise reception of acknowledgement message, regardless if an affected CIC is leased or not. When the blocking is not acknowledged by the remote end before expiry of a supervision timer, the route master will perform pumping of maintenance messages.

If the affected CIC is leased to a call controller, any blocking acknowledgement message will arrive at the call controlling blade due to the message routing mechanism based on CIC. The call controller will inform the route master about reception of blocking acknowledge and continue with normal call processing.

For devices that are not connected to any route, the command is successfully executed and no message is generated, since these devices are already in blocking state.

Procedures Initiated by Remote Node

An incoming maintenance message is distributed in the same way as traffic messages are. If a call is ongoing for the respective CIC, then the message is sent to the call controlling blade, otherwise the message is sent to the blade that hosts the route master. Since the message is not starting a new call, no implied seizure is performed. The blade that is in control will inform the master about the maintenance activity.

The master will inform all blades. The handling for messages affecting several routes does not differ from the handling of message affecting only one route. Each blade will deal with the maintenance message on its own: Reset messages return circuits to idle state, blocking messages do not interrupt ongoing calls.

Once every blade has acknowledged towards the master, the blade handling the maintenance message is informed and will generate an acknowledgement message. Blocking states are preserved even if master and buddy of the affected routes fail simultaneously.

On node level, it is guaranteed that also in multiple blade failure scenarios an acknowledged maintenance message is observed. The worst case that can happen in such scenario is that a maintenance message is not acknowledged or acknowledged with a delay. The remote node would start pumping the maintenance message and the network would return to a stable state when the blade cluster has recovered.

Unequipped Circuit Messages

Reception of UCIC Message

An inbound UCIC message is distributed in the same way as traffic messages are. If a call is ongoing for the respective CIC, then the message is sent to the call controlling blade, otherwise the message is passed to the route master. The blade that is in control will inform the master about the reception of UCIC. The master will inform all active blades to auto-block the CIC. The route master blade raises an alarm. If the message was received in response to an IAM, the controlling blade will try a circuit reselection. The controlling blade passes control of the CIC back to the master.

Sending of UCIC Message

At reception of a message of which the CIC is not connected to any user part a UCIC message will be generated by the distributor to inform the remote exchange about message reception for an unequipped circuit.

Unequipped Circuits in the Range Field

If a call is ongoing for the CIC contained in the routing label, then the message is sent to the call controlling blade, otherwise the message is passed to the route master.

A circuit group reset or circuit group reset acknowledgement message where CIC in the routing label is equipped but one or more of the indicated circuits by the range field is unequipped is discarded.

Any unequipped CIC in the range field of a circuit group (un)blocking message where the circuit identification code in the routing label is equipped is handled as if the unequipped CIC would not be present.

Continuity Check Request

Due to interference with traffic handling for call related continuity check, and in order to allow initiation of continuity check test call from all blades, continuity check procedures are handled by the call controlling blade.

Continuity Check Test Calls

If an initial continuity check request message is received after sending an initial address message, the continuity check request message must be ignored. The distributor dispatches the message just like any other message. The call controller blade will discard the message.

If an IAM is received after an initial continuity check message was sent, any continuity check equipment must be disconnected and the incoming call must be processed. The call process that handles the CC test call has leased the CIC. The distributor dispatches the message just like any other message. The master will be asked to locate the CIC. It will recognize that the CIC is already leased and the IAM will be dispatched to the blade that handles the CC test call. The call controller blade will process the incoming call. There is no need for further communication with the master, since the CIC will remain to be leased for the same circuit by the same blade.

Continuity Re-Check

Continuity re-check is related to call handling. It is performed, when the initial continuity check that was indicated in IAM failed. For inbound calls, CCR message is expected after failed continuity check was indicated by COT message. The first re-check starts at expiry of timer T24 and after further failure the recheck is repeated until success with a time gap determined by timer T25 and then in a loop with a gap determined by timer T26. During the re-check loop, the control of the CIC remains at the call handling blade. Upon successful re-check the control of the CIC is returned to the master in order to allow traffic again.

If a continuity check request message for a repeated continuity check is received after sending an initial address message, processing of the outgoing call will stop and the continuity check request message will be processed by connecting continuity check equipment. There is no need for further communication with the route master, since the CIC will remain to be leased for the same circuit by the same blade.

A-Interface Circuit Handling

Seizure of Devices

Normal Working

For each route, a dedicated blade is responsible to provide free circuits upon request and to return them to the pool of free circuits after call release. This blade is referred to as "route master". Circuits are always selected by the MSC-S, never by the BSC. Therefore, neither seizure collision nor dual seizure can occur. Free devices are found by means of a FIFO idle list.

Handling of Connectionless Messages

Procedures Initiated by Own Node

Procedures that are Initiated by the MSC are
    Blocking and unblocking on circuit and circuit group level
    Reset of individual circuits and on node level.
    Notifications about reception of messages for unequipped
       CICs The blocking states for so called manual blocking are available on all blades. No blocking message is sent towards BSC, since circuits are only selected by MSC.

For devices that are not connected to any route, the command is successfully executed.

Failures during traffic handling that are detected due to protocol timer expiry do not trigger sending of maintenance messages.

Procedures Initiated by Remote Node

Procedures that are Initiated by the BSC are:
    Blocking and unblocking on circuit and circuit group level
    Reset of individual circuits and on BSC level.
    Notifications about reception of messages for unequipped
       CICs An incoming connectionless message is distributed arbitrarily to any blade, which will control handling of that particular message.

That blade informs all blades in active state. The handling for messages affecting several routes does not differ from the handling of message affecting only one route. Each blade will deal with the maintenance activity on its own: Reset messages return circuits to idle state; blocking messages do not interrupt ongoing calls. For messages that are effective on BSC level (reset), each blade checks which routes are connected to that BSC.

The blades notify the message handling blade about the results, which will generate the acknowledge message. The blade that controls the connectionless BSSAP message performs time supervision. The timer is stopped if a reply has been received from all active blades. At expiry of the timer, it sends an acknowledge message to the BSC that is based on the replies received so far.

Blocking states are preserved even if master and buddy of the affected routes fail simultaneously. On node level, it is guaranteed that also in multiple blade failure scenarios an acknowledged maintenance message is observed. The worst case with this solution is that a maintenance message is not acknowledged or acknowledged with a delay. Unless an acknowledgement is received by the BSC within a time supervised period, the BSC repeats the maintenance message once and informs the maintenance system if the operation still fails.

Use cases for blocking, unblocking and reset on circuit and circuit group level should be used for all types of routes that have CICs.

Unequipped Circuit Messages

Reception of UNEQUIPPED CIRCUIT Message

An inbound UNEQUIPPED CIRCUIT message is distributed in the same way as maintenance messages are. All blades are notified to auto-block the CIC. The blade where the route master resides raises an alarm.

Sending of UNEQUIPPED CIRCUIT Message

At reception of a message the distributing blade asks the route master if any blade is in control of the CIC pointed out in the routing label. If the CIC is not connected to BSSMAP, there is no master responsible for the CIC. The distributor will generate an UNEQUIPPED CIRCUIT message to inform the BSC about message received for an unequipped circuit.

If a CIRCUIT GROUP BLOCK or CIRCUIT GROUP UNBLOCK message refers to unequipped circuits, a UNEQUIPPED CIRCUIT message pointing out the unknown circuits is sent by the route master in addition to the acknowledgement message containing the list of blocked/unblocked circuits.

GCP Message Routing

Call Related GCP Message Routing

The routing of call related GCP messages is shown in FIG. 10. It includes the following steps:
1. Transactions that are initiated from MSC side have the blade ID encoded as part of the transaction ID. The call controller blade 135 can send the message to any blade 140a that has a signaling connection towards the MGw. If an M3UA protocol stack is used, there can be multiple blades that have a signaling endpoint.
2. The GCP message containing the transaction (with ADD request command in the figure) is sent to the MGw 400. From MGw point of view, there is nothing that points to the blade cluster structure of the MSC-S.
3. A reply transaction sent from the MGw 400 will contain the same transaction ID (TID) as the request.
4. The receiving signaling endpoint sends any GCP message for decoding to an arbitrarily chosen blade. It is possible to use the blade selection as a means to compensate possible load imbalances between blades in the cluster.
5. The decoder sends the transaction replies contained in the message to the respective call controller blade. The blade ID can be extracted from the TID.

The decoder sends transaction requests that contain a notify command to the call controller blade that requested the notification. The blade ID can be extracted from the request ID that is included in the command. The received transaction request does not point to a specific blade in this case, since the TID was chosen by the MGw.

Non Call Related Message Routing

Service change commands carry non call related maintenance information between MSC-S and MGw. The following sequence shown in FIG. 11 shows how such messages are routed:

1. Maintenance activities on MGw level are performed by the MGw master 400. It applies load balancing when selecting a blade that has a signaling endpoint towards the MGw.
2. The blade that has the signaling connection towards MGw sends a message to the MGw.
3. The receiving signaling endpoint sends any GCP message for decoding to an arbitrarily chosen blade. It is possible to use the blade selection as a means to compensate possible load imbalances between blades in the cluster
4. The decoder 145 sends the transaction replies contained in the message to the respective MGw master blade. The blade ID can be extracted from the TID. Received transaction requests do not point to a specific blade.
5. If the transaction request does not contain a notify command, the transaction is sent to the MGw master.

The invention allows a scalable blade system to handle tasks that can not be parallelized. Tasks are dynamically assigned to individual blades. The message routing as described in this invention disclosure allows to allocate traffic handling activities arbitrarily on any blade, just keeping CP load balancing of the system in mind.

The invention claimed is:

1. A switching center server configured to handle calls, comprising:
   a blade cluster including a plurality of blades, wherein one of the plurality of blades is a master blade configured to centrally control usage, by the blades, of pooled resources for handling calls;
   a distributor configured to retrieve information from the master blade identifying a blade to which a message related to an established call is to be distributed and to distribute the message to the specified blade;
   wherein the distributor is configured to retrieve the information from a Primary Rate Access (PRA) master when the established call is a PRA originating call.

2. The switching center server according to claim 1, wherein the distributor is further configured to:
   receive a message relating to the established call:
   determine the blade, among the plurality of different blades, that is handling the established call;
   distribute the message to the blade that is handling the established call.

3. The switching center server according to claim 1, further comprising a call controller configured to control the resources used by the plurality of blades for the established call.

4. The switching center server according to claim 3, wherein the distributor distributes a message related to an established call to the blade on which the call controller for said established call is provided.

5. The switching center server according to claim 1:
   wherein the distributor is configured to extract resource identification data contained in the message for said established call;
   wherein the switching center server further comprises a call controller configured to control the resources used by the blades for said established call;
   wherein the distributor is further configured to retrieve information from the PRA master blade identifying which blade provides the call controller for the established call using the extracted resource identification and to distribute the message to that blade.

6. The switching center server according to claim 1, wherein the switching center server further comprises a call controller configured to control the resources used by the blades for said established call, wherein the call controller generates a call reference that includes blade identification data, and wherein the distributor distributes a message related to a Primary Rate Access (PRA) terminating call to the blade that handles the established call using said blade identification data.

7. The switching center server according to claim 1, further comprising a balancer configured to allocate the message to one of the blades.

8. The switching center server according to claim 7, wherein the balancer allocates the message depending on information contained in the message, said information comprising at least one of originating information data, destination information data, and signaling link information data.

9. The switching center server according to claim 8, wherein the balancer is configured to allocate messages containing identical originating information data, destination information data, and signaling link information data to the same blade.

10. The switching center server according to claim 7, wherein the balancer is configured to allocate the message to the blade on which the distributor is provided.

11. A switching center server configured to handle calls, comprising:
a blade cluster including a plurality of blades, wherein one of the plurality of blades is a call controller configured to control resources used by the plurality of different blades for a call and to generate transaction identification data that is transmitted to a media gateway, the transaction identification data containing blade identification data that identifies the blade on which the call controller is provided;
a reply message distributor configured to distribute a reply message received from the media gateway to the blade on which the call controller is provided based on the blade identification data;
a master configured to centrally control usage of pooled resources by the blades for handling the call and to control maintenance procedures; and
a distributor configured to retrieve information from the master identifying to which blade a message related to the call is to be distributed, and to distribute the message to that blade;
wherein the distributor sends maintenance messages related to unused resources to the master and sends maintenance messages related to used resources to said call controller;
wherein different blades of the blade cluster are addressable from a remote node by one common address.

12. The switching center server according to claim 11, further comprising a signaling endpoint configured to receive the reply message and to transmit the reply message to one of the blades depending on a signaling load of the different blades, the blade to which the message is transmitted thereby serving as said reply message distributor.

13. The switching center server according to claim 11, wherein the reply message distributor decodes the reply message, retrieves the blade identification data, and distributes the reply message to the blade identified by the blade identification data.

14. The switching center server according to claim 11, wherein the call controller is configured to request a resource for a connection to the remote node from the master.

15. The switching center server according to claim 14, wherein the call controller sends a call control signaling message to the remote node, and wherein the distributor receives a backward message and distributes that backward message to the call controller.

16. The switching center server according to claim 15, further comprising a balancer configured to receive said backward message and transmit said backward message to one of the blades depending on information contained in the backward message, wherein said information comprises at least one of originating information data, destination information data, and signaling link information data.

17. The switching center server according to claim 11, wherein at least one blade is configured to send a notification request to the media gateway, said notification comprising request identification data, the request identification data likewise being included in a notification command received from the media gateway in response and used to direct the notification command to said at least one blade.

18. The switching center server according to claim 11, wherein the call controller informs the master of received maintenance messages.

19. The switching center server according to claim 11, wherein the master informs all blades of the status of the maintenance procedures.

20. A method for distributing information to one of a plurality of blades of a switching center server that handles calls, the method comprising:
receiving a message related to an established call, the message comprising a Primary Rate Access (PRA) originating call;
retrieving information from one of the plurality of blades operating as a master blade that identifies a blade that is handling the established call, the master blade centrally controlling usage of pooled resources by the blades;
distributing the message to the blade that is handling the established call;
wherein receiving a message related to the established call comprises receiving a Primary Rate Access (PRA) originating call and wherein retrieving information comprises retrieving the information from a PRA master.

21. The method according to claim 20, wherein the switching center server includes a call controller that controls the call, sets up the call, supervises the call, or disconnects the call.

22. The method according to claim 20, wherein the switching center server includes a call controller, and wherein said distributing the message comprises distributing the message to the blade on which the call controller is provided.

23. The method according to claim 20, wherein distributing the message further comprises:
allocating the message to one of the blades of the blade cluster; and
distributing the message from said one blade to the blade on which the call controller is provided.

24. The method according to claim 23, wherein the message is allocated to said one of said blades depending on information contained in the message, said information comprising at least one of originating information data, destination information data, and signaling link information data.

25. A method for routing a reply message from a media gateway to a blade of a switching center server having a cluster structure with a plurality of blades, one of the plurality of blades operating as a call controller controlling resources used by the different blades for a call, wherein the switching center server further comprises a master that centrally controls usage of pooled resources by the blades and that controls maintenance procedures, the method comprising:
generating transaction identification data that contains blade identification data, the blade identification data identifying the blade on which the call controller is provided;
transmitting the transaction identification data from the switching center server to the media gateway;
receiving a reply message from the media gateway;
routing said reply message to the blade on which the call controller is provided based on the blade identification data;

distributing a maintenance message related to an established call to the call controller.

26. The method according to claim 25, wherein routing said reply message comprises allocating the reply message to one of the blades and decoding the reply message on said one blade to identify the blade identification data.

27. The method according to claim 25, wherein said receiving comprises receiving the reply message at a signaling endpoint of the switching center server and wherein said routing comprises transmitting the reply message from the signaling endpoint to one of the blades depending on a signaling load of the different blades.

28. The method according to claim 25, wherein the switching center server comprising a plurality of call controllers for the handling of an established call, and wherein said generating transaction identification data comprises generating transaction identification data that contains blade identification data for each involved blade.

29. The method according to claim 25, further comprising:
receiving a message related to the call;
retrieving information from the master that identifies to which blade the message is to be distributed;
distributing the message to that blade;
transmitting a call control signaling message for a connection to a remote node to the remote node;
receiving a backward message from the remote node; and
distributing the backward message to the blade on which the call controller is provided.

30. The method according to claim 29, wherein distributing the backward message comprises accessing the master and requesting information identifying on which blade the call controller is provided.

31. The method according to claim 25, further comprising:
receiving a message related to the call;
retrieving information from a master that identifies to which blade the message is to be distributed, the master centrally controlling usage of pooled resources by the blades;
distributing the message to that blade; and
detecting at the call controller a dual seizure condition for a resource when a seizure request is received from a remote node for the resource and the call controller has already transmitted an initial address message for that resource to another remote node.

32. The method according to claim 25, further comprising:
receiving a message related to the call;
retrieving information from a master that identifies to which blade the message is to be distributed, the master centrally controlling usage of pooled resources by the blades;
distributing the message to that blade; and
queuing a seizure request for resources if that request cannot be met; and
when the master determines that a call attempt is to be removed from the queue, removing the seizure request for said call attempt from the queue.

33. The method according to claim 25, further comprising sending from at least one blade to the media gateway, a notification request that includes request identification data, receiving from the media gateway in response a notification command that likewise includes said request identification data, and directing the notification command to said at least one blade based on the request identification data included in the notification command.

34. The method according to claim 25, further comprising informing the master of maintenance messages received by the call controller.

35. The method according to claim 25, further comprising informing all blades of the status of the maintenance procedures.

36. The method according to claim 25, wherein the method further comprises transmitting failure information to the master that indicates failure of a blade and informing the other blades about the failure.

37. The method according to claim 25, further comprising:
receiving an incoming message related to the call;
retrieving information from the master that identifies to which blade the message is to be distributed, the master centrally controlling usage of pooled resources by the blades;
distributing the message to that blade; and
directly transmitting an outgoing message to its destination.

* * * * *

UNITED STATES PATENT AND TRADEMARK OFFICE
CERTIFICATE OF CORRECTION

| | | |
|---|---|---|
| PATENT NO. | : 9,025,592 B2 | Page 1 of 1 |
| APPLICATION NO. | : 12/993627 | |
| DATED | : May 5, 2015 | |
| INVENTOR(S) | : Speks et al. | |

It is certified that error appears in the above-identified patent and that said Letters Patent is hereby corrected as shown below:

In the specification

In Column 14, Line 60, delete "(JAM)" and insert -- (IAM) --, therefor.

In Column 18, Line 31, delete "are" and insert -- are: --, therefor.

Signed and Sealed this
Twenty-fourth Day of May, 2016

Michelle K. Lee
*Director of the United States Patent and Trademark Office*